US011430171B2

(12) United States Patent
Amer et al.

(10) Patent No.: US 11,430,171 B2
(45) Date of Patent: Aug. 30, 2022

(54) EXPLAINABLE ARTIFICIAL INTELLIGENCE

(71) Applicant: SRI International, Menlo Park, CA (US)

(72) Inventors: Mohamed R. Amer, Brooklyn, NY (US); Timothy J. Meo, Kendall Park, NJ (US); Xiao Lin, Princeton, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 440 days.

(21) Appl. No.: 16/231,059

(22) Filed: Dec. 21, 2018

(65) Prior Publication Data
US 2019/0303404 A1    Oct. 3, 2019

Related U.S. Application Data

(60) Provisional application No. 62/778,754, filed on Dec. 12, 2018, provisional application No. 62/652,195, filed on Apr. 3, 2018.

(51) Int. Cl.
*G06F 16/738*    (2019.01)
*G06T 13/80*    (2011.01)
(Continued)

(52) U.S. Cl.
CPC ............ *G06T 13/80* (2013.01); *G06F 16/345* (2019.01); *G06F 16/738* (2019.01);
(Continued)

(58) Field of Classification Search
CPC .................... G06F 16/70–748; G06F 16/3349
See application file for complete search history.

(56) References Cited

U.S. PATENT DOCUMENTS 5,802,361 A  *  9/1998  Wang .................. G06F 16/7335
                                               382/217
6,593,936 B1 *  7/2003  Huang ............... H04N 1/00209
                                               345/619
(Continued)

FOREIGN PATENT DOCUMENTS

WO    WO2017/161233    9/2017

OTHER PUBLICATIONS

Elliott et al., "Image description using visual dependency representations." Proceedings of the 2013 Conference on Empirical Methods in Natural Language Processing, Association for Computer Linguistics, Oct. 2013, pp. 1-11.
(Continued)

*Primary Examiner* — Robert W Beausoliel, Jr.
*Assistant Examiner* — Nirav K Khakhar
(74) *Attorney, Agent, or Firm* — Shumaker & Sieffert, P.A.

(57) ABSTRACT

This disclosure describes techniques that include generating, based on a description of a scene, a movie or animation that represents at least one possible version of a story corresponding to the description of the scene. This disclosure also describes techniques for training a machine learning model to generate predefined data structures from textual information, visual information, and/or other information about a story, an event, a scene, or a sequence of events or scenes within a story. This disclosure also describes techniques for using GANs to generate, from input, an animation of motion (e.g., an animation or a video clip). This disclosure also describes techniques for implementing an explainable artificial intelligence system that may provide end users with information (e.g., through a user interface) that enables an understanding of at least some of the decisions made by the AI system.

18 Claims, 19 Drawing Sheets

(51) Int. Cl.

| | | |
|---|---|---|
| *G06N 3/04* | (2006.01) | |
| *G06N 3/08* | (2006.01) | |
| *G06N 20/00* | (2019.01) | |
| *G06K 9/62* | (2022.01) | |
| *G06F 16/34* | (2019.01) | |
| *G06F 16/901* | (2019.01) | |
| *G06T 13/40* | (2011.01) | |
| *G06T 7/246* | (2017.01) | |
| *G06F 40/205* | (2020.01) | |
| *G06V 20/40* | (2022.01) | |
| *G06V 40/20* | (2022.01) | |

(52) U.S. Cl.
CPC ........ *G06F 16/9024* (2019.01); *G06F 40/205* (2020.01); *G06K 9/6215* (2013.01); *G06N 3/0445* (2013.01); *G06N 3/0454* (2013.01); *G06N 3/08* (2013.01); *G06N 3/084* (2013.01); *G06N 3/088* (2013.01); *G06N 20/00* (2019.01); *G06T 7/251* (2017.01); *G06T 13/40* (2013.01); *G06V 20/41* (2022.01); *G06V 20/46* (2022.01); *G06V 40/20* (2022.01); *G06V 40/23* (2022.01); *G06T 2207/10016* (2013.01); *G06T 2207/20081* (2013.01); *G06T 2207/20084* (2013.01); *G06T 2207/30196* (2013.01)

(56) References Cited

U.S. PATENT DOCUMENTS

| | | | | |
|---|---|---|---|---|
| 6,741,655 | B1* | 5/2004 | Chang | G06F 16/7857 375/240.26 |
| 7,266,771 | B1* | 9/2007 | Tow | G11B 27/105 715/719 |
| 9,129,158 | B1 | 9/2015 | Medasani et al. | |
| 9,786,084 | B1 | 10/2017 | Bhat et al. | |
| 9,858,340 | B1* | 1/2018 | Frey | G06K 9/6296 |
| 9,875,445 | B2 | 1/2018 | Amer et al. | |
| 2005/0080782 | A1* | 4/2005 | Ratnaparkhi | G06F 16/334 |
| 2007/0192305 | A1* | 8/2007 | Finley | G06F 16/3349 |
| 2008/0071771 | A1* | 3/2008 | Venkataraman | G06F 16/9538 |
| 2008/0071831 | A1* | 3/2008 | Reddy | G06F 16/907 |
| 2008/0126303 | A1* | 5/2008 | Park | G06F 16/78 |
| 2008/0140644 | A1* | 6/2008 | Franks | G06F 16/40 |
| 2010/0070523 | A1* | 3/2010 | Delgo | G11B 27/34 707/769 |
| 2016/0110453 | A1* | 4/2016 | Kim | G06F 16/784 707/749 |
| 2017/0127016 | A1 | 5/2017 | Yu et al. | |
| 2017/0364792 | A1 | 12/2017 | Chai et al. | |
| 2018/0068019 | A1* | 3/2018 | Novikoff | G06F 16/783 |
| 2018/0144059 | A1* | 5/2018 | Saikia | G06F 16/957 |
| 2018/0288431 | A1 | 10/2018 | Liu et al. | |
| 2019/0213254 | A1 | 7/2019 | Ray et al. | |
| 2019/0224853 | A1 | 7/2019 | Gewecke et al. | |
| 2019/0303404 | A1 | 10/2019 | Amer et al. | |
| 2019/0304104 | A1 | 10/2019 | Amer et al. | |
| 2019/0304157 | A1 | 10/2019 | Amer et al. | |
| 2020/0097766 | A1 | 3/2020 | Min et al. | |

OTHER PUBLICATIONS

Jardonnet, "Leveraging plot summaries for video understanding." ENS Cachan, Sep. 22, 2010, pp. 1-30.
Johnson et al. "Image retrieval using scene graphs." Proceedings of the IEEE conference on computer vision and pattern recognition (CVPR), Jun. 7-12, 2015, pp. 1-11.
Xu et al. "Scene graph generation by iterative message passing." Proceedings of the IEEE conference on computer vision and pattern recognition (CVPR) Jul. 21-26, 2017, pp. 1-10.
Amer et al., "2nd Workshop on Computational Models of Social Interactions: Human-Computer-Media Communication (HCMC2015)," Proceedings of the 23rd ACM International Conference on Multimedia, Oct. 2015, 2 pp.
Amer et al., "Deep Multimodal Fusion: A Hybrid Approach," International Journal of Computer Vision, vol. 126, Apr. 2018, 17 pp.
Gotz et al., "HARVEST: An Intelligent Visual Analytic Tool for the Masses," Proceedings of the 1st International Workshop on Intelligent Visual Interfaces for Text Analysis, Feb. 2010, 4 pp.
Stites et al., "Who Did What to Whom? Children Track Story Referents First in Gesture," Journal of Psycholinguist Research, vol. 46, No. 4, Aug. 2017, 14 pp.
Winograd, "Understanding Natural Language," Cognitive Psychology, vol. 3, No. 1, Jan. 1972, 1-191 pp.
Amer et al., "1st Workshop on Computational Models of Social Interactions and Behavior: Scientific Grounding, Sensing, and Applications," Proceedings of the Computer Vision and Pattern Recognition, Jun. 2014, 7 pp.
Anonymous, "A Modular Interface for Multimodal Data Annotation and Visualization with Applications to Conversational AI and Commonsense Grounding," submission to Graphics Interface 2020 Conference, May 2020, 10 pp.
Kim et al., "Learn, Generate, Rank, Explain: A Case Study of Visual Explanation by Generative Machine Learning," Association for Computing Machinery, Apr. 2019, 29 pp.
Abadi et al., "Tensor-Flow: Large-Scale Machine Learning on Heterogeneous Distributed Systems," arXiv, Mar. 2016, 19 pp.
"Accelerated Pictures—Filmmaker Live—VR Storyboarding," Retrieved from Photos—filmmaker live vr storyboarding.png, Nov. 2018, 1 pp.
Ahn et al., "Text2Action: Generative Adversarial Synthesis from Language to Action," CoRR, ArXiv, Oct. 2017, 8 pp.
Allen et al., "Deep Semantic Analysis of Text," Proceedings of the 2008 Conference on Semantics in Text Processing, STPE 08. Association for Computational Linguistics, Sep. 2018, 12 pp.
Amer et al., "Emotion Detection in Speech Using Deep Networks," 2014 IEEE International Conference on Acoustics, Speech and Signal Processing (ICASSP), May 2014, 5 pp.
Arjovsky et al., "Wasserstein GAN," ArXiv, Dec. 6, 2017, 32 pp.
"Auto-Conditioned LSTM Network for Extended Complex Human Motion Synthesis," (ICLR), Jul. 2018, 13 pp.
Awad et al., "TRECVID 2017: Evaluating Ad-Hoc and Instance Video Search, Events Detection, Video Captioning and Hyperlinking," Proceedings of TRECVID 2017, Nov. 2017, 20 pp.
Barratt et al., "A Note on the Inception Score," ArXiv, Jun. 2018, 9 pp.
Barsoum et al., "HP-GAN: Probabilistic 3D Human Motion Prediction Via GAN," IEEE/CVF Conference on Computer Vision and Pattern Recognition Workshops, ArXiv, Nov. 2017, 10 pp.
Beattie et al., "DeepMind Lab," CoRR, Dec. 2016, 11 pp.
Belghazi et al., "MINE: Mutual Information Neural Estimation," ArXiv, Jun. 2018, 18 pp.
Bengio et al., "Curriculum Learning," Proceedings of the 26th International Conference on machine Learning, Jun. 2009, 8 pp.
Bird et al, "Natural Language Processing with Python," O'Reilly Media, Inc., 2009, 504 pp.
Bojanowski, P., "Learning to annotate dynamic video scenes," Computer Vision and pattern Recognition [cs.CV]. ecole normale supérieure, Sep. 2016, 143 pp.
Butepage et al., "Deep Representation Learning for Human Motion Prediction and Classification," IEEE Conference on Computer Vision and Pattern Recognition (CVPR), Apr. 2017, 9 pp.
Cao et al., "Realtime Multi-Person 2D Pose Estimation using part Affinity Fields," ArXiv, Apr. 2017, 9 pp.
Chai et al., "Low Precision Neural Networks Using Subband Decomposition," CogArch Workshop, Mar. 2017, 5 pp.
Chambers et al., "Unsupervised Learning of Narrative Event Chains," Proceedings of Association for Computational Linguistics (ACL-08); Jun. 2008, 9 pp.

(56) References Cited

OTHER PUBLICATIONS

Chambers et al., "Unsupervised Learning of Narrative Schemas and Their Participants," Proceedings of the Joint Conference of the 47th Annual Meeting of the ACL and the 4th International Joint Conference on National Language Processing of the AFNLP, Aug. 2009, 9 pp.
Chen et al., "MXNet: A Flexible and Efficient Machine Learning Library for Heterogeneous Distributed Systems," ArXiv, Dec. 2015, 6 pp.
Chen et al., "Show, Observe and Tell: Attribute-Driven Attention Model for Image Captioning," Proceedings of the 27th International Joint Conference on Artificial Intelligence, Jul. 2018 7 pp.
Chuang et al., "Interpretation and Trust: Designing Model-Driven Visualizations for Text Analysis," Proceedings of the SIGCHI Conference on Human Factors in Computing Systems, May 2012, 10 pp.
Church et al., "Coping with Syntactic Ambiguity or How to put the Block in the Box on the Table," American Journal of Computational Linguistics, vol. 8 No. 3-4, Jul.-Dec. 1982, 11 pp.
"CMU Graphics Lab Motion Capture Database," retrieved from http://mocap.cs.cmu.edu, Jun. 12, 2019, 84 pp.
Dork et al., "Critical InfoVis: Exploring the Politics of Visualization," CHI '13 Extended Abstracts on Human Factors in Computing Systems, May 2013, 10 pp.
Ehrlich et al., "Facial Attributes Classification Using Multi-Task Representation Learning," Proceedings of the IEEE Conference on Computer Vision and Pattern Recognition Workshops, Jun. 2016, 9 pp.
El-Assady et al., "ConToVi: Multi-Party Conversation Exploration Using Topic-Space Views," Computer Graphics Forum, vol. 35, No. 3, Jul. 2016, 10 pp.
Faghri et al., "VSE++: Improved Visual-Semantic Embeddings," ArXiv, Jul. 2017, 9 pp.
Ferguson et al., "Mixed-Initiative Systems for Collaborative Problem Solving," AI Magazine, vol. 28, No. 2, Jun. 2007, 10 pp.
Fragkiadaki et al., "Recurrent Network Models for Kinematic Tracking," IEEE Conference on Computer Vision and Pattern Recognition (CVPR), Aug. 2015, 9 pp.
Gauthier, "Conditional Generative Adversarial Nets for Face Generation," Technical Report, 2015, 9 pp. (Applicant points out, in accordance with MPEP 609.04(a), that the year of publication, 2015, is sufficiently earlier than the effective U.S. filing date, so that the particular month of publication is not in issue.).
Ghosh et al., "Learning Human Motion Models for Long-Term Predictions," IEEE Conference on Computer Vision and Pattern Recognition (CVPR), Dec. 3, 2017, 12 pp.
Godard et al., "Unsupervised Monocular Depth Estimation with Left-Right Consistency," ArXiv, Apr. 2017, 14 pp.
Goodfellow et al., "Generative Adversarial Networks," Proceedings of the International Conference on Neural Information Processing Systems (NIPS), Dec. 2014, 9 pp.
Graves et al., "Automated Curriculum Learning for Neural Networks," Proceedings of the 34th International Conference on Machine Learning (ICML), Apr. 2017, 10 pp.
Gulrajani et al., "Improved Training of Wasserstein GANs," NIPS' 17 Proceedings of the 31st International Conference on Neural Information Processing Systems (NIPS 2017), arXiv:1704.00028v3, Dec. 25, 2017, 20 pp.
Habibie et al., "A Recurrent Variational Autoencoder for Human Motion Synthesis," The 28th British Machine Vision Conference (BMVC), Apr. 2017, 12 pp.
Hahne, "CMU Graphics Lab Motion Capture Database Motionbuilder-Friendly BVH Conversion," retrieved from https:/sites.google.com/a/cgspeed.com/cgspeed/motion-capture/cmu-bvh-conversion, May 29, 2019, 4 pp.
Hanser, E. et al., "Text-to-Animation: Affective Intelligent and Multimodal Visualisation of Natural Language Scripts," School of Computing and Intelligent Systems, University of Ulster, Jun. 2009, 34 pp.
Harrison et al., "Toward Automated Story Generation with Markov Chain Monte Carlo Methods and Deep Neural Networks," Association for the Advancement of Artificial Intelligence (AIIDE-17) Workshop on Intelligent Narrative Technologies, Sep. 2017, 7 pp.
Hendricks et al., "Generating Visual Explanations," ArXiv, Mar. 2016, 17 pp.
Hermann et al., "Grounded Language Learning in a Simulated 3d World," CoRR, Jun. 2017, 22 pp.
Hewlett et al., "Wubble World," Association for the Advancement of Artificial Intelligence (AIIDE), Mar. 2007, 5 pp.
Higgins et al., "Beta-VAE: Learning Basic Visual Concepts with a Constrained Variational Framework," International Conference on Learning Representations, Apr. 2017, 22 pp.
Hinton et al., "A Fast Learning Algorithm for Deep Belief Nets," Neural Computation, vol. 18, Jul. 2006, 28 pp.
Hinton et al., "Reducing the Dimensionality of Data with Neural Networks," Science, vol. 313, Jul. 2006, 4 pp.
Hjelm et al., "Boundary-Seeking Generative Adversarial Networks," ICLR, Feb. 2018, 17 pp.
Hochreiter et al., "Long Short-Term Memory," Neural Computation, vol. 9, No. 8, Nov. 1997, 32 pp.
"Hollywood Camera Work—Shot Designer—Can you block a scene in 30 seconds?" retrieved from https://www.hollywoodcamerawork.com/shot-designer.html, Aug. 27, 2019, 6 pp.
"Hollywood Camera Work—Causality Groundbreaking story development and writing app," retrieved from https://www.hollywoodcamerawork.com/causality.html, Aug. 27, 2019, 12 pp.
Iizuka et al., "Globally and Locally Consistent Image Completion," ACM Transactions on Graphics, vol. 36, No. 4, Jul. 2017, 14 pp.
Ionescu et al., "Human3.6M: Large Scale Datasets and Predictive Methods for 3D Human Sensing in Natural Environments," IEEE Transactions on Pattern Analysis and Machine Intelligence, vol. 36, No. 7, Jul. 2014, 15 pp.
Jain et al., "Structural-RNN: Deep Learning on Spatio-Temporal Graphs," IEEE Conference on Computer Vision and Pattern Recognition (CVPR), Apr. 2016, 10 pp.
Johnson et al., "The Malmo Platform for Artificial Intelligence Experimentation," Proceedings of the 25th International Joint Conference on Artificial Intelligence (IJCAI-16), Jul. 2016, 2 pp.
Karpathy et al., "Deep Visual-Semantic Alignments for Generating Image Descriptions," IEEE Conference on Computer Vision and Pattern Recognition (CVPR), Apr. 2015, 17 pp.
Karpathy et al., "Visualizing and Understanding Recurrent Networks," ArXiv, Nov. 2015, 12 pp.
Kerr et al., "Learning in Wubble World," 2007 IEEE 6th International Conference on Development and Learning, 2007 ICDL, Jul. 2007, 6 pp.
Khan, M., "Natural Language Descriptions for Video Streams," Dissertation for the University of Sheffield, Dec. 2012, 182 pp.
Kim et al., "29a3d53306ddfeefa47f7f088f4c2672", retrieved from http://xai-view.ckprototype.com/#29a3d53306ddfeefa47f7f088f4c2672/1 , Jun. 11, 2019, 6 pp.
Kim et al., "A Modular Interface for Multimodal Data Annotations and Visualization," Proceedings of the 24th International Conference on Intelligent User Interfaces: Companion, Mar. 2019, 6 pp.
Kim et al., "Demo-Text Parse—TRIPS" retrieved from http://cwc-view.ckprototype.com/#18981621125165926, May 30, 2019, 1 pp.
Kim et al., "Learn, Generate, Rank: Generative Ranking of Motion Capture," blog post retrieved from http://genrank.ckprototype.com on May 30, 2019, 7 pp.
Kim et al., "Learn, Generate, Rank: Generative Ranking of Motion Capture," Demo Session at European Conference on Computer Vision, Sep. 2018, 2 pp.
Kim et al., "Learn, Generate, Rank: Generative Ranking of Motion Capture," demo page, retrieved from http://visxai.ckprototype.com/demo, Jun. 11, 2019, 1 pp.
Kim et al., "SMILEE: Symmetric Multi-modal Interactions with Language-gesture Enabled (AI) Embodiment," Proceedings of the 2018 Conference of the North American Chapter of the Association for Computational Linguistics, Jun. 2018, 5 pp.
Kingma et al., "Adam: A Method for Stochastic Optimization," CoRR, ArXiv, Jan. 2017, 15 pp.

(56) References Cited

OTHER PUBLICATIONS

Kingsbury et al., "From Treebank to PropBank," Proceedings of the 3$^{rd}$ International Conference on Language Resources and Evaluation (LREC 2002), May 2002, 5 pp.
Kiros et al., "Skip-Thought Vectors," Advances in Neural Information Processing Systems, Jun. 2015, 11 pp.
Kiros et al., "Unifying Visual-Semantic Embeddings with Multimodal Neural Language Models," ArXiv, Nov. 2014, 13 pp.
Koh et al., "Understanding Black-Box Predictions via Influence Functions," Proceedings of the 34$^{th}$ International Conference on Machine Learning, Jul. 2017, 11 pp.
Kulesza et al., "Principles of Explanatory Debugging to Personalize Interactive Machine Learning," Proceedings of the 20$^{th}$ International Conference on Intelligent User Interfaces, Mar. 2015, 12 pp.
Ledig et al., "Photo-Realistic Single Image Super-Resolution Using a Generative Adversarial Network," IEEE Conference on Computer Vision and Pattern Recognition (CVPR), May 2017, 19 pp.
Li et al., "Tell Me Where to Look: Guided Attention Inference Network," Computer Vision and Pattern Recognition, Feb. 2018, 10 pp.
Lin et al., "Human Motion Modeling using DVGANs" ArXiv; May 2018, 23 pp.
Lin et al., "Leveraging Visual Question Answering for Image-Caption Ranking," Proceedings of the 14$^{th}$ European Conference on Computer Vision (ECCV), Aug. 2016, 21 pp.
Liu et al., "Scrip Visualization (ScripVis): a smart system that makes writing fun," Proceeding of the Second International Conference on Machine Learning and Cybernetics, (IEEE Cat. No. 03EX693), vol. 5, IEEE, Nov. 2003, 6 pp.
Liu et al., "Towards Better Analysis of Deep Convolutional Neural Networks," IEEE Transactions on Visualization and Computer Graphics, vol. 23, No. 1, May 2016, 10 pp.
Liu et al., Unsupervised Image-to-Image Translation Networks, 31$^{st}$ Conference on Neural Information Processing Systems (NIPS), Jul. 2018, 11 pp.
Maaten et al., "Visualizing Data using t-SNE," Journal on Machine Learning Research, vol. 9, Nov. 2008, 27 pp.
Manning et al., "Foundations of Statistical Natural Language Processing," 1999, 704 pp.
Manning et al., "The Stanford CoreNLP Natural Language Processing Toolkit," Proceedings of 52$^{nd}$ Annual Meeting of the Association for Computational Linguistics: System Demonstrations, Association for Computational Linguistics, Jun. 2014, 6 pp.
Marti et al., "CARDINAL: Computer-Assisted Authoring of Movie Scripts," IUI '18 23$^{rd}$ International Conference on Intelligent User Interfaces, Mar. 2018, 11 pp.
Martin et al., "Event Representations for Automated Story Generation with Deep Neural Nets," 32$^{nd}$ AAAI Conference on Artificial Intelligence, Feb. 2018, 8 pp.
Martin et al., "Improvisational Storytelling Agents," 31$^{st}$ Conference on Neural Information Processing Systems (NIPS-2017), Dec. 4, 2017, 4 pp.
Martinez et al., "On Human Motion Prediction using Recurrent Neural Networks," IEEE Conference on Computer Vision and Pattern Recognition (CVPR), May 2017, 10 pp.
McClosky et al., "Event Extraction as Dependency Parsing," Proceedings of 49$^{th}$ Annual Meeting of the Association for Computational Linguistics, BioNLP Shared Task 2011 Workshop, Jun. 2011, 10 pp.
Meo et al., "Aesop: A Visual Storytelling Platform for Conversational AI," Proceedings of the 27$^{th}$ International Joint Conference on Artificial Intelligence (IJCAI-18), 3 pp.
Mikolov et al., "Efficient Estimation of Word Representations in Vector Space," CoRR, ArXiv, Sep. 2013, 12 pp.
"MovieGraphs.png", retrieved from http://moviegraphs.cs.toronto.edu/, Nov. 2018, 1 pp.
Mur-Artal et al., "ORB-SLAM: A Versatile and Accurate Monocular SLAM System," IEEE Transactions on Robotics, vol. 31, No. 5, Oct. 2015, 17 pp.

"MUVIZU animation software," retrieved from http://www.muvizu.com/, May 28, 2019, 4 pp.
Nguyen et al., "Estimating Divergence Functionals and the Likelihood Ratio by Convex Risk Minimization," IEEE Transactions on Information Theory, vol. 56, No. 11, Nov. 2010, 15 pp.
Olah et al, "The Building Blocks of Interpretability," Distill Publication, Mar. 2018, 24 pp.
Perera et al., "Natural Language Dialogue for Building and Learning Models and Structures," Proceedings of the 31$^{st}$ AAAI Conference on Artificial Intelligence (AAAI-17), Feb. 2017, 2 pp.
Press et al., "Language Generation with Recurrent Generative Adversarial Networks Without Pre-Training," ArXiv, Dec. 21, 2017, 5 pp.
Radford et al., "Unsupervised Representation Learning with Deep Convolutional Generative Adversarial Networks," ArXiv, Jan. 2016, 16 pp.
Raghavan et al., "BitNet: Bit-Regularized Deep Neural Networks," ICLR, 2018 Conference, Nov. 2018, 11 pp.
Raghavan et al., "GPU Activity Prediction Using Representation Learning," Proceedings of the 33$^{rd}$ Interational Conference on Machine Learning, Mar. 2017, 5 pp.
Ramachandram et al., "Structure Optimization for Deep Multimodal Fusion Networks Using Graph-Induced Kernels," Proceedings of the 25$^{th}$ European Symposium on Artificial Neural Networks, Jul. 2017, 6 pp.
Redmon et al., "YOLO9000: Better, Faster, Stronger," IEEE Conference on Computer Vision and Pattern Recognition, Dec. 2016, 9 pp.
Redmon et al., "You Only Look Once: Unified, Real-Tie Object Detection," 2016 IEEE Conference on Computer Vision and Pattern Recognition (CVPR), May 2016, 10 pp.
Ribeiro et al., "Why Should I Trust You?": Explaining the Predictions of Any Classifier, Proceedings of the 22$^{nd}$ ACM SIGKDD International Conference on Knowledge Discovery and Data Mining, Aug. 2016, 10 pp.
Ringgaard et al., "SLING: A Framework for Frame Semantic Parsing," CoRR, Oct. 2017, 9 pp.
Salakhutdinov et al., "Deep Boltzmann Machines," Proceedings of the 12$^{th}$ International Conference on Artificial Intelligence and Statistics (AISTATS), Apr. 2009; 8 pp.
Salimans et al., "Improved Techniques for Training GANs," 30$^{th}$ Conference on Neural Information Processing Systems (NIPS), Jun. 2016, 9 pp.
Schroff et al., "FaceNet: A Unified Embedding for Face Recognition and Clustering," 2015 IEEE Conference on Computer Vision and Pattern Recognition (CVPR), Jun. 2015, 10 pp.
Shields et al., "Action-Affect-Gender Classification Using Multi-Task Representation Learning," Proceedings of the IEEE Conference on Computer Vision and Pattern Recognition Workshops, Jul. 2017, 10 pp.
Siddiquie et al., "The Tower Game Dataset: A Multimodal Dataset for Analyzing Social Interaction Predicates," 2015 International Conference on Affective Computing and Intelligent Interaction (ACII), Sep. 2015, 8 pp.
"SLING: A Natural Language Frame Semantics Parser," retrieved from https://github.com/google/sling, May 28, 2019, 3 pp.
Sutskever et al., "Learning Multilevel Distributed Representations for High-Dimensional Sequences," Proceedings of the 11$^{th}$ International Conference on Artificial Intelligence and Statistics (AISTATS), Jan. 2007, 8 pp.
Sutskever et al., "Sequence to Sequence Learning with Neural Networks," CoRR, ArXiv, Dec. 2014, 9 pp.
Sutskever et al., "The Recurrent Temporal Restricted Boltzmann Machine," NIPS'08 Proceedings of the 21$^{st}$ International Conference on Neural Information Processing Systems (NIPS), Dec. 2008, 8 pp.
"Syntactic Structures" Wikipedia, retrieved from https://en.wikipedia.org/wiki/Syntactic_Structures, May 29, 2019, 21 pp.
Taigman et al., "DeepFace: Closing the Gap to Human-Level Performance in Face Verification," 2014 IEEE Conference on Computer Vision and Pattern Recognition, Jun. 2014, 8 pp.

(56) References Cited

OTHER PUBLICATIONS

Tapaswi et al., "MovieQA: Understanding Stories in Movies Through Question-Answering," IEEE Conference on Computer Vision and Pattern Recognition (CVPR), Sep. 2016, 10 pp.
Taylor et al., "Two Distributed-State Models for Generating High-Dimensional Time Series," Journal of Machine Learning Research, vol. 12, Feb. 2011, 44 pp.
Tozzo etal "Neural Events Extraction from Movie Descriptions" Proceedings of the First Workshop on Storytelling, Jun. 2018, 7 pp.
Tran et al., "Edward: A Library for Probabilistic Modeling, Inference, and Criticism," arXiv, Feb. 2017, 33 pp.
Vicol et al., "MovieGraphs: Towards Understanding Human-Centric Situations from Videos," CoRR, ArXiv, Apr. 2018, 23 pp.
Vinyals et al., "Show and Tell: A Neural Image Caption Generator," Computer Vision and Pattern Recognition, Apr. 2015, 9 pp.
Wang et al., "High-Resolution Image Synthesis and Semantic Manipulation with Conditional GANs," IEEE Conference on Computer Vision and Pattern Recognition (CVPR), Aug. 2018, 14 pp.
Werbos, "Backpropagation Through Tie: What it Does and How to Do It," Proceedings of the IEEE, vol. 78, No. 10, Oct. 1990, 11 pp.
Weston et al., "Towards AI-complete Question Answering: A Set of Prerequisite Toy Tasks," CoRR, ArXiv, Dec. 2015, 14 pp.
Zahavy et al., "Graying the Black Box: Understanding DQNs," Proceedings of the 33$^{rd}$ International Conference on Machine Learning, Apr. 2017, 32 pp.
Zeiler et al., "Visualizing and Understanding Convolutional Networks," European Conference on Compute Vision, Sep. 2014, 16 pp.
Zhao et al., "Interactive Exploration of Implicit and Explicit Relations in Faceted Datasets," IEEE Transactions on Visualization and Computer Graphics, vol. 19, No. 12, Dec. 2013, 10 pp.
Zhu et al., "A Stochastic Grammar of Images," Foundations and Treads® in Computer Graphics and Vision, vol. 2 No. 4, Jan. 2006, 104 pp.
Zhu et al., "Aligning Books and Movies: Towards Story-Like Visual Explanations by Watching Movies and Reading Books," Proceedings of the IEEE International Conference on Computer Vision, Dec. 2015, 9 pp.
Zhu et al., "Unpaired Image-to-Image Translation Using Cycle-Consistent Adversarial Networks," IEEE International Conference on computer Vision (ICCV), ArXiv, Nov. 2018, 18 pp.
U.S. Appl. No. 16/230,945, filed Dec. 21, 2018, (Inventors: Amer, Mohamed R. et al.).
U.S. Appl. No. 16/230,987, filed Dec. 21, 2018, (Inventors: Amer, Mohamed R. et al.).
U.S. Appl. No. 16/231,020, filed Dec. 21, 2018, (Inventors: Amer, Mohamed R. et al.).
Li et al., "Video Generation from Text", The Thirty-Second AAAI Conference on Artificial Intelligence (AAAI-18), pp. 7065-7072, (Feb. 2018).

* cited by examiner

112' { Neil enters a bar drunk. He argues with the bartender. He picks a fight with a cowboy. The cowboy punches him so hard. Neil passes out. The bartender is happy.

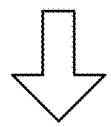

117' { Event-1: "Who: Neil", "Did What: Entered Drunk", "Where: Bar"
Event-2: "Who: Neil", "Did What: Argues", "To Who: The bartender"
Event-3: "Who: Neil", "Did What: Picks a Fight", "To Who: The Cowboy"
Event-4: "Who: The Cowboy", "Did What: Punches Hard", "To Who: Neil"
Event-5: "Who: Neil", "Did What: Passes out"
Event-6: "Who: The Bartender", "Did What: is happy"

FIG. 2A

117' {
Event-1: "Who: Neil", "Did What: Entered Drunk", "Where: Bar"
Event-2: "Who: Neil", "Did What: Argues", "To Who: The bartender"
Event-3: "Who: Neil", "Did What: Picks a Fight", "To Who: The Cowboy"
Event-4: "Who: The Cowboy", "Did What: Punches Hard", "To Who: Neil"
Event-5: "Who: Neil", "Did What: Passes out"
Event-6: "Who: The Bartender", "Did What: is happy"
}

EXPLAINABLE ARTIFICIAL INTELLIGENCE

CROSS REFERENCE

This application claims the benefit of U.S. Provisional Patent Application No. 62/652,195, filed on Apr. 3, 2018, and U.S. Provisional Patent Application No. 62/778,754, filed on Dec. 12, 2018, the entire content of both of these applications is hereby incorporated by reference.

GOVERNMENT LICENSE RIGHTS

This invention was made with Government support under contract no. W911NF-15-C-0246 awarded by the U.S. Army Research Office and under contract number FA8750-17-C-0115 awarded by the Air Force Research Laboratory (AFRL) and Defense Advanced Research Projects Agency. The Government has certain rights in this invention.

TECHNICAL FIELD

This disclosure relates to artificial intelligence, and in particular, to machine learning systems that are trained based on textual, audio, visual, and/or video information.

BACKGROUND

Video is now ubiquitous in society, and plays a significant role in entertainment, education, surveillance, recordkeeping, business, and other fields. Artificial intelligence techniques, such as machine learning, are starting to be applied to disciplines that involve video, and such techniques may have implications for interactive storytelling, video search, surveillance applications, user interface design, and other fields.

SUMMARY

This disclosure describes techniques that include generating, based on a description of a scene, a movie or animation that represents at least one possible version of a story or corresponding to the description of the scene. In some examples, textual story information and/or user input is used to create, by applying artificial intelligence and/or machine learning techniques, a data structure resulting from parsing the textual story information and/or user input. The data structure may specify attributes associated with objects in the description and may further specify relationships between at least some of the objects, thus providing a semantic representation of the description. The data structure may then be used to generate a possible animation or movie that corresponds to the data structure.

In other examples, story information and/or user input may include, in addition to textual information, audio or video information that is captured, recognized, and/or interpreted to augment the data structure, and thereby further specify attributes of an animation or movie that is generated from the data structure. In some examples, the data structure is implemented as a composition graph or a spatio-temporal event graph in which nodes represent actors, props, and/or instances, and where edges represent events or relationships.

This disclosure also describes techniques for training a machine learning model to generate predefined data structures from textual information, visual information, and/or other information about a story, an event, a scene, or a sequence of events or scenes within a story. In some examples, training data and/or new input data is parsed into a "who" "did what" "to whom or what" "when" and "where"-stylized event frame, providing a parsing structure that enables a trained machine learning model to generate output corresponding to those structured labels within the frame. This disclosure also describes techniques for enabling a machine learning model to use implicit knowledge gained from training samples to provide context or additional information when generating, from new input, a predefined data structure corresponding to a story, an event, a scene, or a sequence of events.

This disclosure also describes techniques for using generative adversarial networks (GANs) to generate, from input, an animation of motion (e.g., an animation or a video clip). In some examples, a dense validation GAN (DVGAN) is trained to generate an animation using a set of abstracted animations of motion. Such generated animations may be used not only in the context of visual storytelling, but also for other purposes, such as in the fields of robotics, surveillance, and video search.

This disclosure also describes techniques for implementing an explainable artificial intelligence (XAI) system that may provide end users with information that enables an understanding of at least some of the decisions made by the AI system. In some examples, such an XAI may be implemented in the context of a video search service, where one or more animations are generated based on a search query. The generated animations are then compared to a set of videos or animations in a data store of videos or animations to identify videos or animations that are similar to the generated animation. The videos or animations that are determined to be similar to the generated animations may be identified as videos or animations that are relevant to the search query. In some examples, the generated animations may be produced through any of a number of techniques, including through GANs, DVGANs, or other techniques. The resulting search results may be presented in a user interface along with information about the generated animations used to identify the search result videos, thereby providing some background as to how the AI system identified the search results.

The techniques described herein may provide one or more technical advantages. For example, using the techniques described herein, a machine learning system may be developed that is capable of interacting with a human collaborator to receive a scene description and suggest a data structure usable for generating a visual representation of the description, to quickly allow the human collaborator to envision the description. The human collaborator and the machine learning system may cooperatively and iteratively adjust the scene by modifying the scene description to arrive at a satisfactory visual representation of the scene.

Also, parsing data into a structured event frame may have the advantage of simplifying the machine learning process, and it may facilitate the task of instantiating an event as an animation or presenting the event object to a human user for consideration and/or evaluation. Parsing data into a structured event frame may also improve the ability of a machine learning model to accurately predict an appropriate data structure from new input. In addition, by providing a source of implicit knowledge to the machine learning model, predefined data structures may more accurately represent a scene, without requiring, as input, explicit details about all aspects of a story, event, scene, or sequence of events.

Also, use of a dense validation GAN to generate animations may have the benefit of enabling a GAN discriminator to more accurately determine whether a particular video or animation is a sample from a real or generated distribution. By more accurately making such a determination, a DVGAN may more accurately predict an animation corresponding to a text input phrase describing motion.

Also, by implementing one or more aspects of the present disclosure through an XAI system, end users relying on such a system may have a better understanding of the system's overall strengths and weaknesses, an understanding of how the system will behave in the future, and perhaps how to correct the system's mistakes. This information may also enable end users to appropriately trust, and effectively manage decisions made by such a system.

In one example, this disclosure describes a method for identifying a relevant animation from among a plurality of animations, comprising: receiving, by a computing system, a search query describing motion; generating, by a computing system, a search animation, wherein the search animation includes visual information representing the motion; comparing, by the computing system, the search animation to each of the plurality of animations to generate, for each of the plurality of animations, a comparison score indicating similarity of each respective animation to the search animation; and identifying, by the computing system and based on each of the comparison scores associated with each of the plurality of animations, the relevant animation from among the plurality of animations.

In another example, this disclosure describes a system comprising: a storage device; and processing circuitry having access to the storage device and configured to: receive a search query describing motion, generate a search animation, wherein the search animation includes visual information representing the motion, compare the search animation to each of the plurality of animations to generate, for each of the plurality of animations, a comparison score indicating similarity of each respective stored animation to the search animation, and identify, based on each of the comparison scores associated with each of the plurality of animations, the relevant animation from among the plurality of animations.

In another example, this disclosure describes a computer-readable storage medium comprising instructions that, when executed, configure processing circuitry of a computing system to: receive a search query describing motion; generate a search animation, wherein the search animation includes visual information representing the motion; compare the search animation to each of the plurality of animations to generate, for each of the plurality of animations, a comparison score indicating similarity of each respective animation to the search animation; and identify, based on each of the comparison scores associated with each of the plurality of animations, the relevant animation from among the plurality of animations.

The details of one or more examples of the disclosure are set forth in the accompanying drawings and the description below. Other features, objects, and advantages of the disclosure may be apparent from the description and drawings, and from the claims.

BRIEF DESCRIPTION OF THE DRAWINGS

FIG. 2A, FIG. 2B, and FIG. 2C are conceptual diagrams illustrating conversion of text into an animation, in accordance with one or more aspects of the present disclosure.

DETAILED DESCRIPTION

Figure 1A:
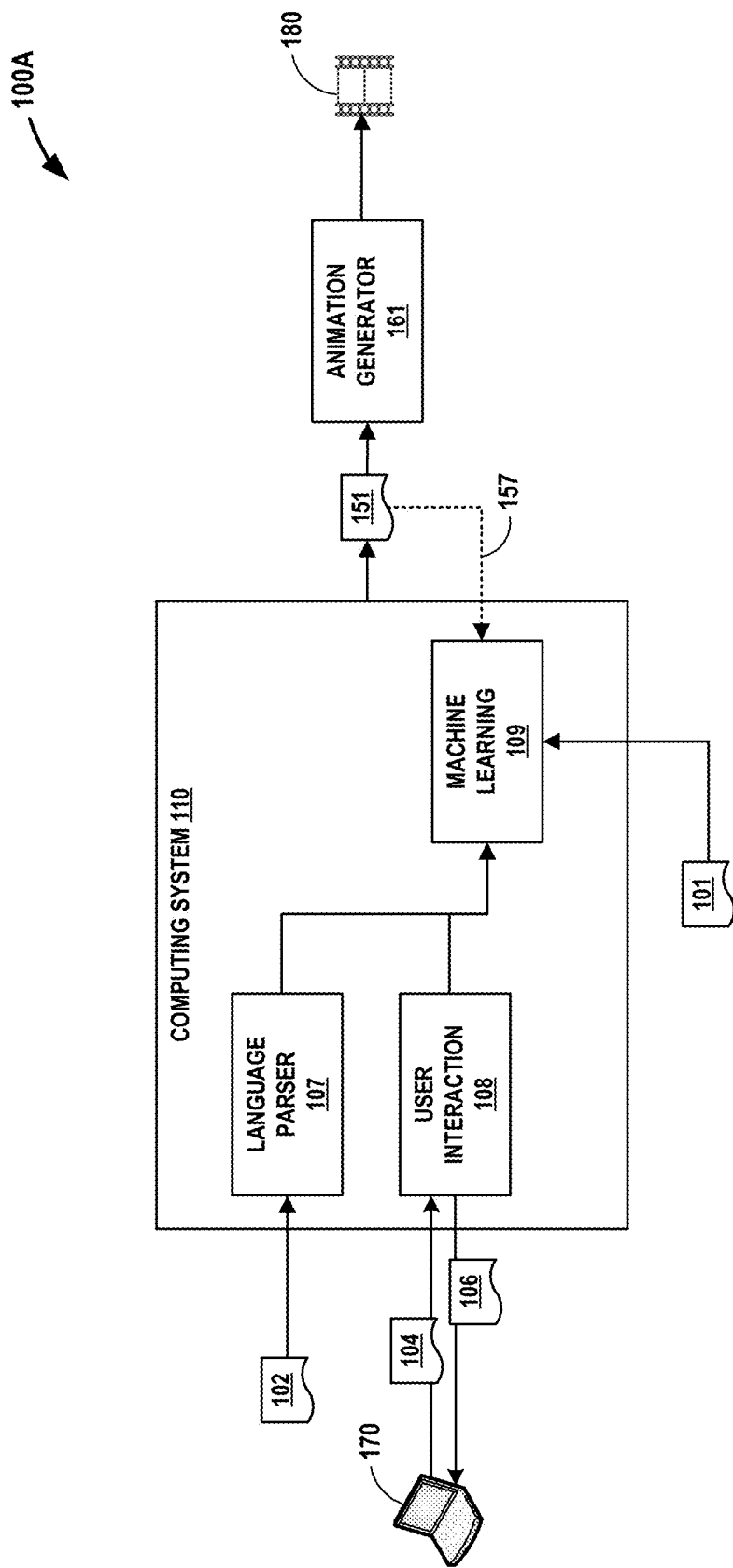
FIG. 1A is a conceptual diagram illustrating an example system for converting text into an animation, movie, or other visual representation, in accordance with one or more aspects of the present disclosure.

In interactive storytelling, multiple parties generate story fragments in coordination with one another, building off of their own ideas of the narrative to piece together a single coherent story. In at least some cultures, interactive storytelling plays an important role in understanding communication. To construct a story using interactive storytelling may require multiple types of interactions, which include listening to other storytellers to make logical continuations of the narrative, understanding common story arcs and tropes, understanding facial expressions, gestures and non-vocal communication, and even responding to audience cues.

Many of the skills and practices used in interactive storytelling may benefit from assistance by artificial intelligence or artificially-intelligent agents or other systems. Often, the interaction between humans and agents or machines has focused on handling directives given by the human user. However, a mixed-initiative collaboration where humans and artificial intelligence (AI) agents operate as approximate or near-equals, or at least as collaboration partners, may significantly improve the efficiency and quality of interactive storytelling. For instance, an artificially-intelligent agent that is capable of communicating a goal to a human collaborator, and operating as a near-equal in the process, opens the door for many potential applications. One or more aspects of the present disclosure may enable one or more humans to communicate with AI agents to generate animated movies to tell a story, enable collaborative visualizing of a narrative, and/or enable communication with AI agents to understand and relate both parties' (human and AI agent) perceptions of the world. In some examples described herein, a narrative is a description of a sequence of events, similar to illustrated books for children, with the intent of informing, educating, or entertaining. In a mixed-initiative system, one or more humans and one or more AI agents may operate as a team on such a narrative, in which all collaborators may perform parts of the task at which they respectively excel. Some aspects of this disclosure relate to an AI agent or system generating an animation or video in response to human input and/or human interactions, which is one significant, and perhaps fundamental, task that may be performed in a mixed-initiative system relating to interactive storytelling. A team's ability to identify and communicate about this and other sub-tasks may enable a significantly improved ability to accomplish tasks underlying collaborative interactive storytelling. Although aspects of this disclosure relate to AI-assisted generation of animations or videos for the purpose of facilitating interactive storytelling, such AI-assisted generation of animations can be applied in other contexts as well, and may be used in applications that involve human motion generally, and include applications involving interactions in visual and physical worlds, robotics, animation, surveillance, and video search.

Understanding events is often important to understand narrative, whether applied in an interactive storytelling context or in other applications. Accordingly, aspects of this disclosure relate to techniques for training a machine learning system to understand narrative and context, and employ both explicit and implicit knowledge about a scene or sequence of scenes or events to intelligently and/or accurately represent (e.g., as a data structure, an animation, or a video) scenes, sequences of events, or narrative.

FIG. 1A is a conceptual diagram illustrating an example system for converting text into an animation, movie, or other visual representation, in accordance with one or more aspects of the present disclosure. The example of FIG. 1A illustrates system 100A including computing system 110 and animation generator 161. Computing system 110 includes language parser 107, user interaction module 108, and machine learning module 109. Language parser 107 accepts textual description 102 and generates parsed text. Interaction module 108 accepts input 104 from user interface device 170. Interaction module 108 interacts with user interface device 170 by sending output 106 to user interface device 170 and receiving additional responsive input 104. Machine learning module 109 may be trained using training data 101. Once trained, machine learning module 109 may receive data from language parser 107 and interaction module 108 and output data structure 151. Animation generator 161 converts data structure 151 into animation 180.

Machine learning module 109 may represent a system that uses machine learning techniques (e.g., neural networks, deep learning, generative adversarial networks (GANs), convolutional neural networks (CNNs), recurrent neural networks (RNNs), or other artificial intelligence and/or machine learning techniques) to generate data structure 151 based on data of a type corresponding to textual description 102 and/or input 104. Machine learning module 109 may apply first-order logic to identify objects, attributes of objects, and spatio-temporal relationships among objects in the textual description 102. In some examples, machine learning module 109 is trained by training data 101 to generate an appropriate or representative data structure corresponding to input. Training data 101 may include information about a set of scenes or event sequences. Training data 101 may represent a source of knowledge and commonsense grounding, and when training data 101 is used to train machine learning module 109, may enable machine learning module 109 to translate textual (and in some cases, non-textual) concepts into data structures representing events in a given scene. In some examples, training data 101 may include data derived from actual video clips from movies (e.g., well-known or popular movies), which may be a particularly rich and convenient source for training data associated with human interactions. Training data 101 may include human centric annotations, actors or characters appearing in the scenes or event sequences, objects, spatial and other relationships between actors and objects, interactions between characters, timestamps at which actions initiate and conclude, a description of the situation depicted in the scene, subtitles, text of the scene's narrative content, a summary or natural language description of the scene's narrative content, and other information. The term "actor" may not be limited to human actors but may encompass any object that perform one or more actions, such as an animated character, a robot, a non-human animal, camera, computing system, etc. Machine learning module 109 uses parameters identified during training to thereafter process new input data received from language parser 107 and/or interaction module 108.

In some examples, machine learning module 109 is trained using supervised machine learning techniques that involve providing training data 101 to machine learning module 109 (including both the training sets and corresponding appropriate output data structures), and determining a set of parameters for generating, from new data, appropriate data to be included within a data structure. (In some examples, the data structure is generated in advance, but the components of data that fill the data structure are predicted.) Training data 101 therefore may also include, for each set of scenes or event sequences, information about a grounded data structure that would appropriately represent each set of scenes or event sequences included within training data 101. Once trained, machine learning module 109 uses the parameters identified as a result of the training process to generate new data structures from new input data. For instance, in the example of FIG. 1A, machine learning module 109 uses parameters derived from the training process to generate data structure 151 from textual descriptions 102 and input 104. In some examples, data structure 151 corresponds to a representation of the scene or event sequences that includes each relevant spatio-temporal and object-attribute relationship. Data structure 151 may serve as an intermediate representation between text, natural language, and non-verbal (e.g. gesture information) and the visual domain, and may include sufficient information to enable an animation or visual representation of the scene to be generated from data structure 151.

In accordance with one or more aspects of the present disclosure, computing system 110 may process textual description 102. For instance, in the example of FIG. 1A, language parser 107 detects input in the form of textual descriptions 102 of a story. In some examples, textual descriptions 102 could correspond to a script or a portion of a script associated with a movie, a play, or any other performance or story. Textual descriptions 102 could include dialogue uttered by actors in the story, or summaries of the story or a scene within the story or a sequence of events within a story, or textual descriptions 102 could include any other textual description of a sequence of events. In other examples, textual descriptions 102 may correspond to a search query or other description or expression of a scene, sequence of events, or desired animation or representation of motion. Language parser 107 parses textual description 102 and outputs the parsed input to machine learning module 109.

Computing system 110 may process input 104. For instance, in the example of FIG. 1A, interaction module 108 detects a signal from user interface device 170 and determines that the signal corresponds to one or more instances of user input 104. Input 104 may represent commands or story descriptions (or portions thereof) typed on a keyboard associated with a computer-based user interface. A command might be a request to create an object or an actor to be included within the story. A story description might describe attributes of a scene or event, or describe an event or sequence of events within the story (e.g., "Jane called Sam using the new mobile phone"). Alternatively, or in addition, input 104 might include parsed text recognized from spoken speech by a user (e.g., an operator of user interface device 170), and such parsed text might also correspond to commands or story descriptions.

In some examples, interaction module 108 may engage in an information exchange (e.g., a "conversational AI" exchange) whereby interaction module 108 collects input 104 from a user of user interface device 170, and based on the input 104, may generate output 106, prompting a user of user interface device 170 for further information. In such an example, and in response to receiving input 104, interaction module 108 may generate output 106 which may include a prompt for information about one or more aspects of a scene or story, such as an action performed by an actor, an article of clothing worn by an actor, a location of one of the objects in the scene, or an attribute associated with a prop in the scene. In some examples, the prompt may relate to an ambiguity in a scene (or story) identified by computing system 110 that has not been resolved by other information received by computing system 110. User interface device 170 may present the prompt within a user interface. User interface device 170 may detect input in response to the prompt, and send further input 104 to interaction module 108. User interface device 170 and interaction module 108 may further exchange information, prompts, or other information. In some examples, some of the output 106 sent to user interface device 170 may include information about processing performed by interaction module 108 and/or machine learning module 109, and may serve as feedback to provide visibility, to a user of user interface device 170, into how interaction module 108 and/or machine learning module 109 have interpreted input 104. Interaction module 108 eventually processes some or all instances of user input 104 and output information about one or more instances of user input 104 to machine learning module 109.

Machine learning module 109 may generate data structure 151. For instance, in FIG. 1A, machine learning module 109 uses parameters identified during training (e.g., using training data 101) to process input data received from language parser 107 and/or interaction module 108. Based on the parameters and the data received from language parser 107 and machine learning module 109, machine learning module 109 generates data structure 151.

System 100A may ultimately generate animation 180 from data structure 151. For instance, in the example of FIG. 1A, machine learning module 109 outputs data structure 151 to animation generator 161. Animation generator 161 determines, based on data structure 151, attributes of an animation that corresponds to data structure 151. Animation generator 161 uses the attributes to generate animation 180. In some examples, animation generator 161 uses the attributes to automatically generate animation 180, without requiring further input from a user. The animation may be presented on a display, a television screen, a projection or other large-format screen, presented in a virtual reality system, or presented in any manner now known or hereinafter developed.

In some examples, the information exchange described above may also (or alternatively) take the form of a user asking one or more questions of computing system 110. For instance, in one such example, user interface device 170 detects input and outputs an indication of input to interaction module 108. Interaction module 108 determines that the input corresponds to a query posed by a user of device 170 about the scene. The query posed by the user may be a specific question about a movie scene represented by data structure 151. Interaction module 108 and/or machine learning module 109 uses data structure 151 (which represents an understanding or structural representation of the corresponding scene, story, or movie) to determine a response to the query. Machine learning module 109 identifies a response to the query, and causes interaction module 108 to send output 106 to device 170. Device 170 receives output 106 and presents a user interface that includes the response to the query identified by machine learning module 109.

Although in some examples, machine learning module 109 may be initially trained using training data 101, parameters underlying and/or used by machine learning module 109 may also be occasionally or continually refined based on later interactions and/or collaborations with a user of device 170. For instance, language parser 107 may receive textual information about a new sequence of events or scenes. In one example, the sequence of events describes a meeting between actors. Language parser 107 parses the textual information and outputs information about the parsed text to machine learning module 109. Machine learning module 109 generates data structure 151.

User interaction module 108 may thereafter detect textual input from device 170, corresponding to additional information that a user of device 170 seeks to incorporate into the description of the scene (i.e., as represented by data structure 151). This additional information may specify that the meeting described above takes place in a conference room with a table, chairs, and a video conference display. Machine learning module 109 may update data structure 151 to incorporate this additional information. Machine learning module 109 may also update its parameters to learn from the revisions or refinements proposed by the user. Such an update or refinement capability may be represented by feedback input 157.

Machine learning module 109 may receive a subsequent request to predict a data structure 151 about a different scene that involves a meeting. Machine learning module 109 may assume, when responding to this subsequent request, that such a meeting takes place in a conference room with a table, chairs, and a video conference display. Accordingly, machine learning module 109 may, in the manner described, update its parameters to incorporate feedback from users of device 170 about data structures 151, and over time, become more effective at generating data structures 151 that accurately represent textual information about stories or descriptions of event sequences.

As described above, animation 180 may be used in the context of a mixed-initiative system relating to interactive storytelling. In such a system, one or more humans communicate with AI agents (corresponding to computing system 101 and/or animation generator 161) to generate animated movies to tell a story, enable collaborative visualizing of a narrative, and/or enable communication with AI agents to understand and relate both parties' (human and AI agent) perceptions of the world.

Animation 180 may alternatively, or in addition, be used in other applications. One such application includes, as further described in connection with FIG. 6A and FIG. 6B, using animation 180 in a system that uses model-generated motion capture animations based on textual queries (e.g., animation 180 generated from textual description 102), and then uses such animations to search for and/or identify matching or similar videos within a data store of videos. Such a system may also rank at least some of the videos within the database of videos based on relevance to the search query.

Machine learning module 109 may apply any of a number of other techniques, beyond those referenced in connection with FIG. 1A, for generating a video clip, video, and/or animation from textual description 102 (or from input generally). In one example, machine learning module 109 employs a dense validation GAN (DVGAN) model for motion generation and/or motion completion. Such a DVGAN model may use a combination of convolutional and recurrent discriminators and generators, and may treat class labels as text, which may serve as a good regularizer for such a model. A DVGAN model may, in some examples, be extensible to bounding boxes and segmentation, and graph generation. Accordingly, when using a DVGAN, it may be possible to accept free-form text and generate smooth compositional action sequences.

In general, GANs are implemented with two differentiable networks, a generator and discriminator. The generator's (counterfeiter) objective is to generate data that looks real. The discriminator's (appraiser) objective is to assign high value to real data and low value to fake videos. The goal of such a model is to learn the parameters of the generator $\theta_g$ that is able to represent the data distribution, $p_r$, thus the optimization goal is to improve the generator's distribution $p_g$ to match the data distribution $p_r$. The generator network produces a sample, and the discriminator network is trained to identify whether the sample is generated by the model or a training sample, which may require no supervision. Both networks are trained using the same gradients since they are differentiable. The distance between the distributions is measured using Jensen-Shannon divergence. The formulation solves a dual problem by finding equilibrium in a min-max game with the value function $J(D,G)$.

Conditional GANs (CGANs) enable conditioning on a class label y or text with distribution $p_l$. CGANs can be constructed by simply conditioning both the generator and discriminator on y. In some cases, GAN optimization is unstable and requires careful balancing between learning the generator and discriminator. Wasserstein GANs (WGANs) can be used to improve the stability of GANs. WGANs minimize the distance between $p_r$ and $p_g$. WGANs with a gradient penalty (WGANs-GP) can be used to improve WGAN's stability even further by replacing weights clipping with a gradient penalty to a loss function.

In some examples, module 109 combines CNNs and RNNs as discriminator and generator for motion generation using WGAN-GP to generate an animation from a textual description 102. In such an example, module 109 uses of two types of generators, an RNN generator and a CNN generator. In some examples, the RNN generator is capable of motion completion and generation and the CNN is capable of motion generation. The RNN generator is first initialized by generating an initial frame using an Multi-Layered Perceptron (MLP), or uses initial seed frame(s), followed by generating frame differences using an LSTM-RNN which takes as input a concatenation of the previous frame and an animation "plot" for the current frame encoded as vectors, and generates the next frame through adding a difference to the previous frame.

The CNN generator starts from a low frame-rate animation, then progressively increases the temporal resolution by up-sampling and refining low-frame rate animations into high frame rate ones using a stack of residual deconvolution operations. In some examples, each residual convolution module doubles the frame-rate. Generating an animation with N frames may require $\log_2(N)$ residual convolution modules and $\log_2(N)+1$ plot modules. At level i, a plot module decides what new motion should be introduced to all frames based on the text representation $h_{txt}$ and $2^i$ frames by k channels gaussian latent code matrix $z_i$. A one-dimensional convolution is used to decode the hidden representation at the final resolution and output the skeleton animation.

In some examples, module 109 may first produce a longer version of the animation, and then make short cuts out of the longer animation to sample an animation segment. The CNN generator may first run for one additional convolution layer and generate an animation "tape" that has length 2N, and then the "final cut" layer selects a consecutive length N segment as the final output under a uniform distribution of cut location. Similarly, the RNN generator runs for 2N iterations, and then applies final cut to generate a length N segment. In this way, the top-layer latent variable $z_0$ does not need to explicitly encode information for generating the first frame for periodic motion.

GAN discriminators typically operate differently than classifiers. Rather than predicting the action or object, the job of a GAN discriminator is to tell whether the videos or images are sampled from a real or generated distribution. The discriminator gradients are used to train the network. In order to improve the gradients, importance weights may be introduced into the generated samples to provide a policy gradient which enable training on continuous data without conditioning. Further, dense validation and data augmentation modifications, as described below, may be applied to the discriminator for further improvements.

Dense Validation: Compositionality in neural networks follows the intuition that high-level representations are formed by combining lower-level representations. For example, to detect an object, a CNN starts by detecting edges, combining them into more complex structures, such as parts in images, and then reasoning is done at the high-level representation. Using the same analogy and applying to human motion, a CNN reasons about high-level motions by combining lower-level motion. In the usual GAN framework, the discriminator's goal is to capture the networks' artifacts at the high-level to detect a fake. But artifacts do not compose like parts do: a higher-level image or motion artifact is not composed of lower-level image artifacts. For example, a cat might be detected through a combination of eye, nose, mouth and ears, a fake cat is not just a combination of two fake eyes, a fake nose, a fake mouth and two fake ears. It would only take one fake part for the full image to be fake. Further, a combination of real parts in a fake order may render an image fake. Accordingly, artifacts do not compose like parts compose to objects. Higher-level artifacts such as misplacements of parts may be quite independent of lower-level artifacts. The same observation also applies to RNNs, that artifacts in different frames in a video may be more independent than compositional.

Accordingly, GAN discriminators, which might be included within module 109, may produce scores at every time resolution and every frame (or a significant fraction of such time resolutions and frames). A CNN discriminator may still be used to encode the content of the input animations to provide context. Module 109 may add further validation modules that inspect intermediate representations at every time-resolution and every frame to ensure that artifacts can be reported very quickly or immediately. Parameters of validation modules at the same resolution may be shared, while parameters of validation modules at different resolutions may be independent. Module 109 may include a validation module that is a two-layer MLP (implemented as size-1 convolutions for parameter sharing over frames) that matches a motion representation at a particular time-resolution and frame, with textual input 102. The discriminator produces a final score as a convex combination of validation scores at different resolutions (the weights are parameters of the discriminator network). This is useful for WGAN where the discriminator network as a whole is restricted to Lipschitz-1 because doing so may enable validation modules at different resolutions to adjust their local Lipschitz constants through adjusting the weights. Through such a design, the motion generation quality may be improved compared to scoring only the final convolution layer or every other convolution layer.

Data augmentation: Module 109 may treat artifact detection as a translation-invariant problem, and randomly perturb the input video to the discriminator and zero-pad the unknowns. Such a procedure may improve the translation-invariance aspect of the discriminator. It may also reduce one typical failure pattern that the motion pattern of first half of the generated video is different from the second half. This limitation may be due to the ability of the discriminator to detect higher-level artifacts using low sampling resolutions at top layers due to down-sampling. The discriminator may fail to detect the difference between motion patterns in the first half and the second half of the animation. Stochastically shifting the input videos perturbs the sampling grid for higher-level layers, enabling the detection of such failure patterns.

In some examples, the CNN Discriminator may mirror the CNN generator. The input video is first encoded into a N frames by k channels representation through size-1 one-dimensional convolution. In some examples, module 109 may validate the hidden representations at every resolution and every frame using $\log_2(N)$ validation modules. For generators with final cut, that may require $\log_2(N)+1$ residual convolution modules and $\log_2(N)+2$ plot modules. Module 109 may combine the validation scores through a learned convex combination.

Module 109 may optimize the WGAN-GP loss to train its generators. The generators might not be restricted to predicting the ground truth motion, but can generalize over different motions and generate multiple modes of realistic motions for the given action without being penalized. As a result, such generators may show substantially improved robustness when generating long sequences. As a result, a DVGAN trained on, for example, five-second video clips may be capable of generating realistic motions reaching 300 seconds and beyond.

Module 109 may first preprocess training data to represent body-joint angles in exponential maps, and then normalize the skeleton representation by subtracting mean and dividing by standard deviation. For both generators and discriminator, module 109 may set the hidden size for all modules to be k=256. In some examples, a language model for action description encoding may be a 2-layer LSTM with 256 hidden units, and the word embeddings are learned from scratch; the $LSTM_{diff}$ module in the RNN generator may also be a 2-layer LSTM with 256 hidden units.

For optimization, module 109 may pair either a CNN or a RNN generator with the CNN discriminator, and learn parameters using a WGAN-GP model with $\lambda=10$, where the discriminator maximizes the loss and the generator minimizes the loss. Module 109 may run the Adam optimizer with learning rate $1\times10^{-4}$ for 20,000 iterations. In some examples, in each iteration the discriminator is updated 10 times before the generator is updated once, and all the parameter tuning is based on a grid search to find the optimal set.

Figure 1B:
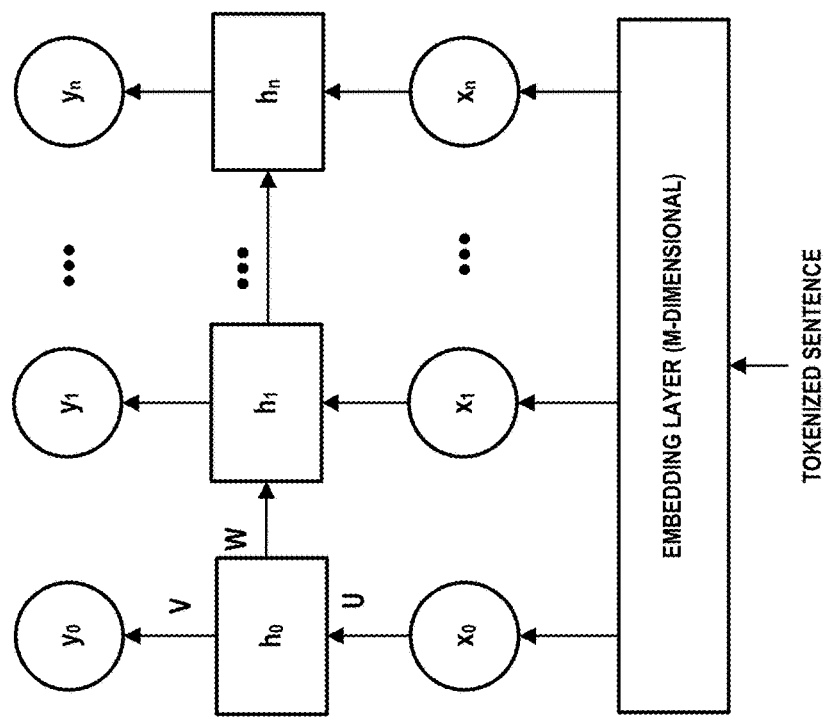
FIG. 1B is a conceptual diagram illustrating a model that generates an event frame based on a tokenized sentence, in accordance with one or more aspects of the present disclosure.

FIG. 1B is a conceptual diagram illustrating a model that generates an event frame based on a tokenized sentence. Model 100B of FIG. 1B can be used to understand one or more events within a narrative and/or storyline, and may be employed by language parser 107 of FIG. 1A to process text input 102. Model 100B may extract events using Natural Language Processing (NLP) techniques to construct an event frame identifying specific attributes. For instance, the model of FIG. 1B may, in some examples, extract event frames from movie descriptions in the format of a "who" "did what" "to whom or what" "when" and "where" event frame. Other questions, such as "how" and "why" may be addressed as well, but may, in some examples, require a more complex or different model or event frame.

In some cases, syntactic NLP parsers focus on examining characteristics of the words, grammatical structure, word order, and meaning. Neural NLP approaches, on the other hand, often rely on large corpora to train such models in addition multiple knowledge databases. These approaches perform event extraction often without context (often visual) of a movie or a movie script. As described herein, when performing event extraction in relation to events in a story, the context can be gleaned from descriptions of the set or characters or prior events in a sequence. In some examples, an event extraction framework can be used for a mixed-initiative, human-computer system and to generate a human-readable event structure for user interaction. Accordingly, techniques in accordance with one or more aspects of the present disclosure may differ to some extent from syntactic approaches, and employ a hybrid, neural and symbolic, approach. Such an approach may benefit from both neural and symbolic formulations to extract events from movie text. Neural networks have been successfully applied to NLP problems, such as in sequence-to-sequence or (sequence-to-vector) models applied to machine translation and word-to-vector approaches. In some examples, techniques in accordance with one or more aspects of the present disclosure combine those approaches with supplemental structural information, such as sentence length in a textual description of a scene. Such an approach may model local information and global sentence structure.

By extracting particular components of an event (e.g., in an event frame having a "who" "did what" "to whom or what" "when" and "where" format), a trained model (e.g., machine learning module 109) may more easily instantiate an event as an animation using existing software or present the event object to a human users for them to instantiate on their own terms. As described herein, once events are extracted in this format, a sequence of events frames can be used to animate the script and generate a short movie. In contrast to a purely symbolic approach, a neural approach, which may apply Recurrent Neural Networks (RNN), may be more effective. In some cases, an RNN will learn to output a structure mirroring the symbolic approaches. The input nodes are encoded as a fixed sequence of identical length and the output are labels of the provided structure.

Accordingly, rather than simply relying on a deep learning model to perform the task of translating a sentence into an event, the problem presented to the learning model may, as described herein, be simplified by adding structure to the output data object (e.g., an "output sentence"). As described, the output sentence may be structured into an event frame, where some of the components of the event frame could be present or absent. Where one or more of the components are missing, module 109 (and/or another module) may either prompt a user for the missing information, or proceed without the missing information. For instance, module 109 might not be able to identify a location for a given event frame, but may prompt a user for input to complete that component of the event frame. Furthermore, some sentences could contain multiple events. Weak labels can be extracted from each sentence using the predicate as an anchor. Using such a structured approach may help encode information about the relationships between words.

As illustrated in FIG. 1B, and in operation, each word in an input tokenized sentence is encoded to an M-dimensional vector (e.g., using a model trained to reconstruct linguistic contexts of words, such as word2vec). The embedding output vectors input an M-dimensional RNN with long short term memory (LSTM) units. In the example shown, the length of the sentence may be standardized by padding short sentences and capping the length of the longest sentence to a specific length (e.g., 25 words). The hidden state of each unit is defined in the equations below for $h^{(t)}$:

$$f^{(t)} = \sigma(W_{fh} h^{(t-1)} + W_{fx} x^{(t)} + b_f)$$

$$\tilde{c}^{(t)} = \tan h(W_{ch} h^{(t-1)} + W_{cx} x^{(t)} + b_c)$$

$$i^{(t)} = \sigma(W_{ih} h^{(t-1)} + W_{ix} x^{(t)} + b_i)$$

$$C^{(t)} = C^{(t-1)} \cdot f^{(t)} + i^{(t)} \cdot \tilde{c}^{(t)}$$

$$o^{(t)} = \sigma(W_{oh} h^{(t-1)} + W_{ox} x^{(t)} + b_o)$$

$$h^{(t)} = \tan h(C^{(t)}) \cdot o^{(t)}$$

The output of each unit is $o^{(t)}$ and is equal to the hidden state, as defined above. The internal cell state is defined by $C^{(t)}$. Intermediate variables $f^{(t)}$, $i^{(t)}$, and $\tilde{c}^{(t)}$, facilitate readability and correspond to forget, input, and candidate gates, respectively. The cell state and the hidden state are propagated forwards in time to the next LSTM unit. In some examples, class imbalance can be a significant hurdle in training a of network in this instance. In the example of FIG. 1B, the model may be trained using standard back-propagation with a weighted cross-entropy loss function used to avoid over-fitting to the null class.

In some examples, curriculum learning techniques may also be employed. Curriculum learning techniques are used to improve machine learning in situations where a model can learn to perform better on a difficult task if it is first presented with easier training examples. Generally, when curriculum learning is employed, the final model attains a higher performance than if it were trained on the most difficult task from the start. In accordance with one or more aspects of the present disclosure, the curriculum difficulty metric used by machine learning module 109 may be based on sentence length, which may be appropriate because shorter sentences tend to have a simpler structure and/or a fewer number of events, although sentences vary in difficulty due to structure, context, vocabulary, and other attributes. Other difficulty metrics such as average word length, longest word length, and readability score might also be employed.

In one example, the training samples may be divided into multiple difficulty groups based on sentence length (e.g., easy, medium, and hard difficulty sets). Machine learning module 109 is first trained with the easiest set for 100 epochs before advancing to the medium and hard difficulty training sets, training for 100 epochs each. This results in 300 training epochs total, although the model may be only exposed to a third of the dataset for 100 epochs at a time. In some examples, the results of such training may be compared to that of models where the training process exposes machine learning module 109 to the entire corpus for 300 epochs. Although in this example, sentence length has been described as being used as a difficulty metric, where shorter sentences are assumed to be easier, other structural and semantic metrics can be alternatively or additionally be used.

Figure 1C:
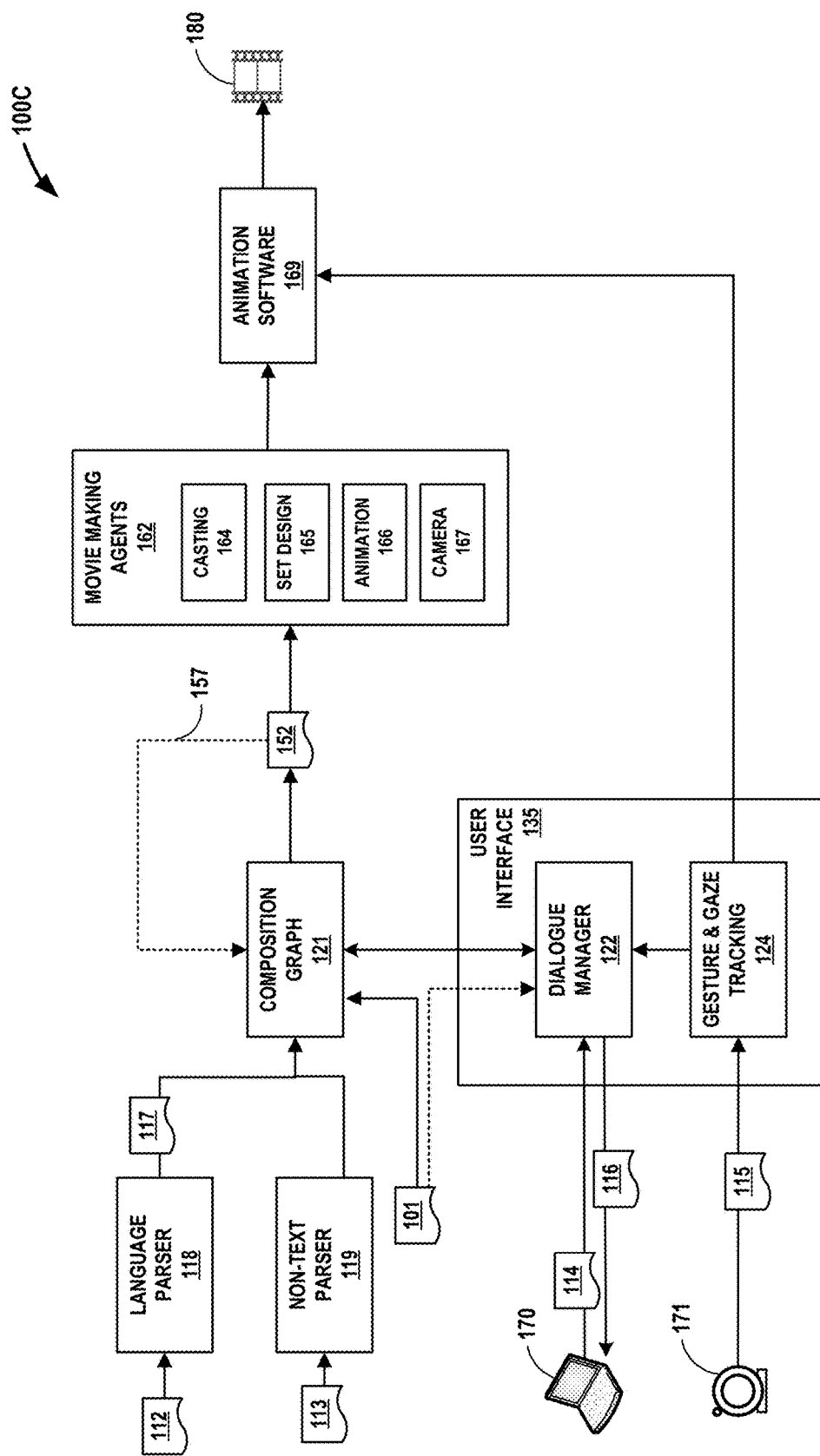
FIG. 1C is a conceptual diagram illustrating an example system for converting text and non-text information into an animation, movie, or other visual representation, in accordance with one or more aspects of the present disclosure.

FIG. 1C is a conceptual diagram illustrating an example system for converting text and non-text information into an animation, movie, or other visual representation, in accordance with one or more aspects of the present disclosure. The example of FIG. 1C illustrates system 100C, which is shown converting a set of data including textual scene or story information 112, non-text story information 113, user input 114, and/or non-text user input 115 into animation 180. User interface system 135 includes dialogue manager 122 and gesture and gesture and gaze tracking module 124. Dialogue manager 122 interacts with user interface device 170, and may receive user input 114 from user interface device 170 and send output 116 to user interface device 170 as part of a conversation or information exchange with a user of user interface device 170. Sensor 171 may detect or sense images, motion, and/or speech and may be a camera and/or a behavior analytics system capable of detecting movements, gestures, poses, and other information. Sensor 171 may output non-text user input 115 to gesture and gaze tracking module 124. Gesture and gaze tracking module 124 may send information about non-text user input 115 to dialogue manager 122. Dialogue manager 122 may send information about user input 114 and non-text user input 115 to composition graph module 121. Composition graph module 121 accepts parsed text 117 as well as the input from non-text processor 119 and dialogue manager 122 and generates composition graph 152. Movie-making agent module 162 receives composition graph 152 from composition graph module 121. Movie-making agent module 162 includes a number of movie or animation-making agents, including casting agent 164, set design agent 165, animation agent 166, and camera agent 167. The agents within movie-making agent module 162 collectively process composition graph 152 and output information about composition graph 152 to animation software 169. Animation software 169 generates animation 180 based on the information about composition graph 152.

As with machine learning module 109 of FIG. 1A, composition graph module 121 of FIG. 1C may represent a system that uses machine learning techniques to generate a data structure that corresponds to input. Typically, composition graph module 121 is trained, prior to use, with training data 101, and may be incrementally trained thereafter through feedback 157, as described in connection with FIG. 1A. Training data 101 may include information similar to the types of information expected to be presented as input to composition graph module 121 in FIG. 1C. As part of the training process, composition graph module 121 identifies parameters that it later applies, using a learning model, to new input. The learning module generates, based on the parameters and the new input, a data structure (e.g., composition graph 152) that appropriately corresponds to the new input, based on the learning model's training.

In accordance with one or more aspects of the present disclosure, system 100C may process both text and non-text information about a scene or a sequence of events. For instance, in the example of FIG. 1C, language parser 118 detects input in the form of one or more instances of textual scene or story information 112. Language parser 118 parses the input and outputs parsed text 117 to composition graph module 121. In some examples, non-text processor 119 may detect input in the form of one or more instances of non-text scene information 113. Such non-text scene information may be audio clips, video clips, or other information about the scene. Non-text processor 119 may process non-text scene information 113 and output the processed information to composition graph module 121.

Dialogue manager 122 may collect additional information about the scene from a user of user interface device 170. In some examples, one or more instances of user input 114 may be in the form of commands (or queries), or may be responses to queries posed by dialogue manager 122 (e.g., through output 116), or may otherwise be information about a scene. For instance, dialogue manager may detect input corresponding to a request to move an actor from one location to another, or to adorn an actor with a hat, or to animate an actor to walk toward another actor. In general, dialogue manager 122 may detect input corresponding to a user command to adjust other aspects of a scene (e.g., "increase the size of the table," "create a crack in the vase," or "move the table towards William"). Dialogue manager 122 outputs information to composition graph module 121 corresponding to the data derived from interactions (a collection of user inputs 114 and output 116) that dialogue manager 122 engages in with a user of user interface device 170. Composition graph module 121 may update composition graph 152 accordingly.

Further, in some examples, sensor 171 may detect input from a user, and may output one or more instances of non-text user input 115 to gesture and gaze tracking module 124. One or more instances of non-text user input 115 may include information about gestures, gaze direction, movements, posture, poses, and other information describing or otherwise relevant to a scene or sequence of events. Gesture and gaze tracking module 124 outputs, to dialogue manager 122, information about non-text user input 115. Dialogue manager 122 passes the information about non-text user input 115 to composition graph module 121. Composition graph module 121 creates and/or updates composition graph 152 appropriately, and may use information received from language parser 118, non-text processor 119, dialogue manager 122, and/or gesture and gaze tracking module 124.

In some examples, language parser 118 and/or dialogue manager 122 may be or may include any of a variety of natural language parsers, which may include model 100B of FIG. 1B, and may alternatively, or in addition, include symbolic (e.g., a TRIPS parser) or neural parsers. In one such example, a parser generates, based on textual scene information 112 and/or user input 114, a semantic representation structured around events and their various arguments. The parser may, in such an example, use a general language-level ontology that is augmented with domain-specific knowledge about the visual domain. The parser may output a directed acyclic graph among ontology tokens that represents entities, events and their relationships including spatial, temporal, and lexico-semantic relationships. As further described below, dialogue manager 122 may use the graph to determine an appropriate problem-solving act that represents a common goal between the human and computer, and may be used as the basis for an exchange, interaction, and/or conversation between dialogue manager 122 and a user of user interface device 170. Based on such an exchange, dialogue manager 122 may output information to composition graph module 121, and composition graph module 121 may create or update composition graph 152 as appropriate.

In the example of FIG. 1C, composition graph 152 may be a directed graph representation of a scene. Composition graph 152 may be used to represent the spatio-temporal and object-attribute relationships within a scene. Also, composition graph 152 may, like data structure 151, serve as an intermediate representation between natural language and the visual domain. Composition graph 152 may associate actors and props with their attributes, spatial relationships, and temporal relationships such as interactions with other actors and actions.

To generate composition graph 152 from input (e.g., textual scene information 112, non-text story information 113, user input 114, and non-text user input 115), composition graph module 121 may use machine learning techniques that enable composition graph module 121 to generate composition graph 152 from an arbitrary set of input of the type corresponding to textual scene information 112, non-text story information 113, user input 114, and/or non-text user input 115. In such an example, composition graph module 121 may be trained using training data 101. Training data 101 may, as described in connection with FIG. 1A, represent a source of knowledge and commonsense grounding that includes human centric annotations, actors or characters appearing in scenes or event sequences, objects, relationships and interactions between actors and objects, timestamps, and descriptions. Once trained, composition graph module 121 uses parameters identified as a result of the training process to generate new composition graph 152 for new input data. Composition graph module 121 may also be trained to identify ambiguities in the input data, prompt a user for appropriate information to resolve such ambiguities, and/or resolve such ambiguities by determining the most probable or appropriate composition graph 152 for a given set of inputs.

Composition graph module 121 may cause dialogue manager 122 to assist in resolving ambiguities about how composition graph 152 should be constructed or structured, and/or to assist in confirming assumptions made by composition graph module 121 in generating composition graph 152. One way for dialogue manager 122 to provide such assistance is for dialogue manager 122 to engage in an information exchange (e.g., a conversational AI exchange) with a user of user interface device 170, thereby collecting further information that can be used to resolve ambiguities or confirm assumptions. For instance, in some examples, composition graph module 121 may generate an initial composition graph 152 based on information from language parser 118, dialogue manager 122 and/or gesture and gaze tracking module 124. Composition graph module 121 may also cause movie-making agent module 162 and animation software 169 to generate an initial animation 180. Composition graph module 121 may thereafter cause dialogue manager 122 to exchange information with a user of user interface device 170, causing dialogue manager 122 to send output 116 to user interface device 170 and receive responsive user input 114 from user interface device 170. Dialogue manager 122 may provide updated information (collected during the exchange) to composition graph module 121, thereby causing composition graph module 121 to update composition graph 152. Composition graph module 121 may maintain a collaborate state for composition graph 152, as each of composition graph module 121 and a user of user interface device 170 express (through dialogue manager 122) their own goals relating to generating an appropriate and representative composition graph 152, and thereby animation 180. Accordingly, composition graph module 121 may receive, from dialogue manager 122, state-change acts applied to goals or domain-specific actions, which may affect the structure, content, or nature of composition graph 152. For instance, composition graph module 121 may, based on collaborative information from dialogue manager 122, spawn actors or objects, change their attributes and locations, animate various motions with emotional modifiers, manipulate multiple cameras and capture video. When composition graph 152 consists of missing information, composition graph module 121 may determine whether to prompt the user for a clarification versus sampling from a probabilistic model initiating a communicative act.

During a conversational AI exchange, dialogue manager 122 may parse user input 114 (e.g., an utterance from a user of user interface device 170) and communicate information about user input 114 to composition graph module 121. Composition graph module 121 may apply a set of domain independent rules to determine shifts in collaborative state for composition graph 152 state via collaborative problem-solving acts. Such rules may implement a set of problem-solving acts, which may include proposing goals or informing the user (or composition graph module 121) of goal failures. Composition graph module 121 uses the new state to evaluate the problem in relation to the environment or model. Composition graph module 121 may pass a change in problem solving state to a natural language generation module which provides information, visibility, and/or feedback to the user about the success or failure of its last action and next steps. Composition graph module 121 may update composition graph 152 based on the conversational AI exchange.

Based on composition graph 152, movie-making agent module 162 and animation software 169 may generate animation 180. For instance, in the example of FIG. 1C, composition graph module 121 outputs composition graph 152 to movie-making agent module 162. Movie-making agent module 162 processes composition graph 152. Based on composition graph 152, movie-making agent module 162 interacts with animation software 169 to cause animation software 169 to generate animation 180. In the example of FIG. 1C, movie-making agent module 162 interacts with animation software 169 using a number of agents to translate composition graph 152 into API calls that are fed to animation software 169, thereby causing animation software 169 to generate animation 180. The agents included within movie-making agent module 162 may include one or more casting agents 164, one or more set design agents 165, one or more animation agents 166, and one or more camera agents 167.

Casting agent 164 may generate actors that match the character descriptions in a script or other textual description, or in other input. For instance, in one example, language parser 118 may parse text such as "John wore a black hat and a tuxedo with a white shirt." Language parser 118 identifies a set of "attire" tags for clothing. Composition graph module 121 interprets these descriptions as character attributes and includes such attributes as part of composition graph 152. Casting agent 164 configures (e.g., makes API call to) animation software 169 to include the attributes within animation 180.

Set design agent 165 processes composition graph 152 and identifies props, scenery objects, and other objects associated with the scene. Set design agent 165 processes scene descriptions, including locations, from textual and other information about the scene. In one example, set design agent 165 identifies that composition graph 152 indicates that "John and Mary drank coffee in the cafe," where the "cafe" is identified with a "location" tag. Set design agent 165 configures animation software 169 to generate animation 180 in a manner consistent with the information about the set or the scene at which events take place.

Animation agent 166 may process composition graph 152 to identify events occurring in the script or commands. In some examples, animation agent 166 may generate a data structure, such as an "event frame," that uses the output of language parser 118 (or another module) to identify subject, predicate, object, and time and place (when available). Animation agent 166 maps this information into a "who" "did what" "to whom/what" "where" and "when"-style event frame. Modeling events in this format facilitates mixed-initiative systems for instantiating events in animation software, providing human users with familiar terms. In some examples, complex questions of "how" and "why" might require significantly more reasoning than other questions, and the event frame data structure may facilitate processing of such complex questions.

Camera agent 167 identifies types, attributes, and/or characteristics of camera shots needed or appropriate for animating a scene. Often, camera shots are described in a script's slug lines, which may be highly specific in format and language. Because such language may be highly-specific and specialized, camera agent 167 may use a regular expression processor to identify specific shots (e.g., "interior," "external," or "close-up").

As in FIG. 1A, animation 180 may be used in the context of a mixed-initiative system relating to interactive storytelling, where one or more humans collaborate with an AI system, as illustrated and described in connection with FIG. 1C and elsewhere herein, to generate animated movies that tell a story. Also as in FIG. 1A, animation 180 of FIG. 1C may alternatively, or in addition, be used in other applications, such as in a search system that uses animation 180 to search and rank videos within a database of videos.

Figure 1D:
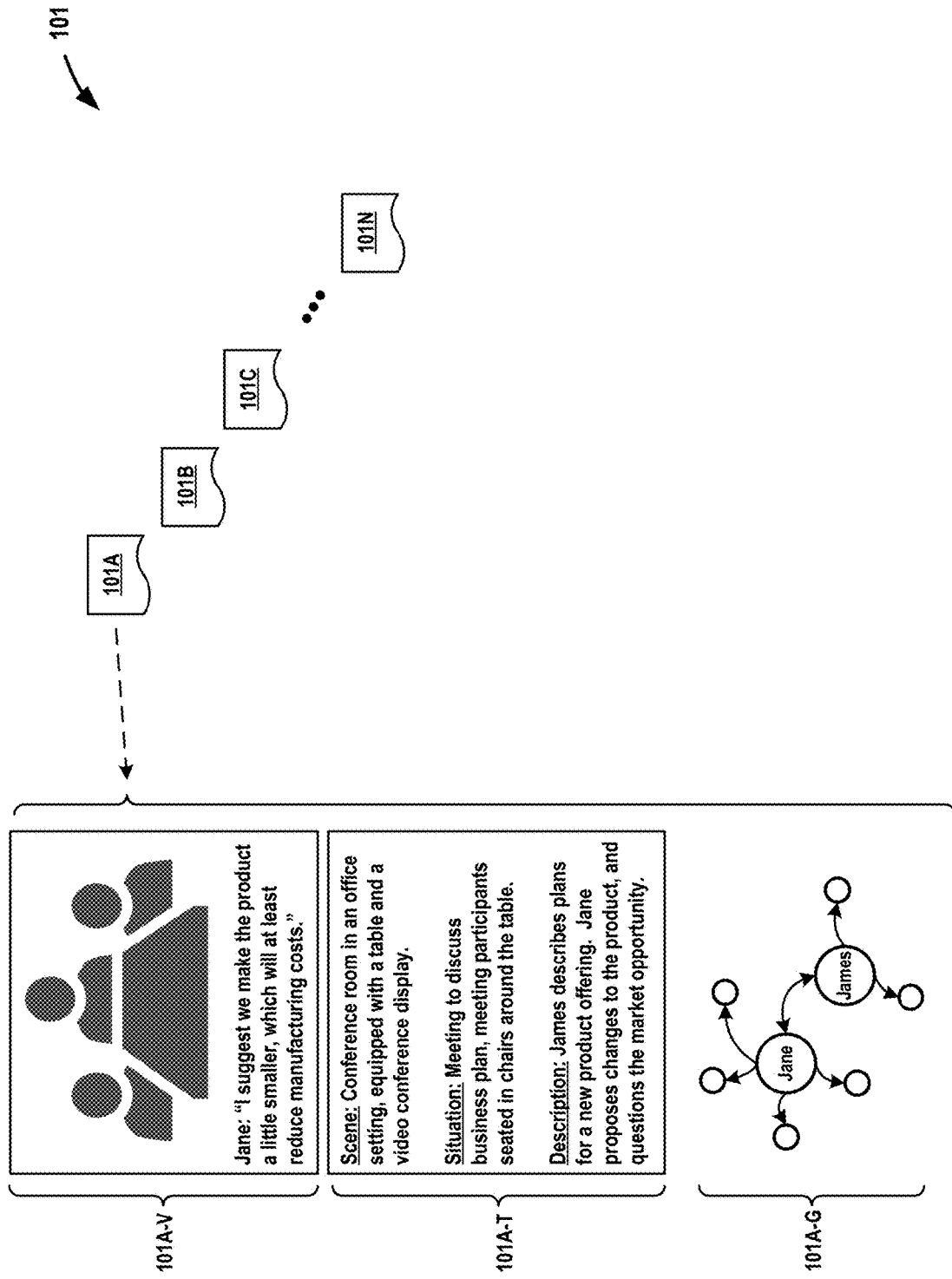
FIG. 1D is a conceptual diagram illustrating the composition of an example training set, in accordance with one or more aspects of the present disclosure.

FIG. 1D is a conceptual diagram illustrating items included within an example training set in accordance with one or more aspects of the present disclosure. FIG. 1D illustrates an example set of training data 101, which may include a number of training samples 101A through 101N (representing any number of training samples). Each such training sample may include visual information, textual information, and possibly additional information about a story, an event, a scene, or a sequence of events or scenes. For instance, in the example illustrated in FIG. 1D, training sample 101A includes visual information 101A-V and textual information 101A-T. Visual information 101A-V may correspond to a video clip from a movie or other video, and textual information 101A-T may correspond to a script, a description, or other textual representation of information associated with a story, an event, a scene, or a sequence of events or scenes. In some cases, each training sample may include (or be augmented to include) other information, including visual, textual, or other information about characters who appear in the scene, their attributes (both physical and emotional), spatial or other relationships and interactions between characters, timestamps at which actions initiate and conclude, a label for the situation depicted in the scene, objects and/or props, and/or a natural language description of the scene's narrative content.

In some examples, each training sample may also include a data structure (e.g., 101A-G) that corresponds to the visual, textual, and other information (e.g., 101A-V and 101A-T) associated with the training sample. The data structure 101A-G may, in some examples, be a graph data structure (e.g., a spatio-temporal composition graph) that can be used, in a supervised learning process based on training sample data (e.g., 101A-V and 101-T), to train a machine learning module to generate a predicted graph data structure from new or arbitrary visual, textual, and/or other information about a story, event, scene, or sequence of events or scenes.

In FIG. 1C, composition graph module 121 may understand explicit information provided in a training sample, but module 121 may also use implicit knowledge to generate predicted graphs from new input about a story or sequence of events. For example, training sample 101A, illustrated in FIG. 1D, describes a meeting between Jane and James, and data 101A-T includes explicit information describing that the meeting takes place in a conference room equipped with a video conferencing display and with meeting participants seated in chairs. When trained with training sample 101A (and potentially other supporting training samples), module 121 may learn that a meeting typically involves participants meeting in a conference room equipped with a video conferencing display, and with participants seated in chairs.

Accordingly, when later presented with information about a story that describes a meeting between actors, but does not provide any details about the setting, module 121 may rely on implicit knowledge, derived from training samples such as sample 101A, to fill in details not otherwise provided. For instance, module 121 may, in such an example, predict a graph data structure that places the meeting participants seated in chairs in an office conference room that is equipped with a video conferencing display. In such examples, module 121 may be trained using neural events extraction techniques using such training examples. Further, module 121 may convert the nodes into a spatio-temporal graph that represents events through time, where time might be an abstraction through an order of events, and where each event may eventually get instantiated into an animation or illustration of an ordered set of events.

Training a machine learning model, such as that represented by module 109 of FIG. 1A and/or module 121 of FIG. 1C may involve parsing text and visual data of the type illustrated in FIG. 1D. For parsing textual information, speech text may be parsed using a TRIPS parser, as described above, and in addition, the SLING parser (see https://github.com/google/sling) may be used for story text parsing. SLING is a frame-semantic parser for natural language frame that uses a semantic frame that represents a collection of facts, features, and attributes of a denotatum and its characteristic interactions with others. The set of frames may be stored in a frame graph where each frame is a node and relevant links to or interactions with other frames are edges.

In some examples, SLING is trained in an end to end fashion using bidirectional LSTMs for input encoding and a Transition Based Recurrent Unit (TRBU) for output decoding. Transition systems are widely used to build dependency parse trees in addition to computing a sequence of state transitions. The TRBU is a feed-forward unit with a single hidden layer using the hidden activations from bidirectional LSTM input encoders and the activations from previous steps as inputs.

As described above, composition graph module 121 may use the output of a natural language parser to identify a subject, predicate, object, and time and place (when available), and map them, respectively, to a "who" "did what" "to whom/what" "where" and "when"-style event frame. Modeling events in this format may facilitates mixed-initiative systems for instantiating events in animation software, providing human users with familiar terms.

In some examples, module 121 may use corpus of text annotated with information about basic semantic properties (e.g., the Proposition Bank schema). A SLING parser may adapt such annotations to enable the parser to identify the arguments of predicates, both the subject and the object affected by the subject. In some examples, module 121 may be able to use the links between frames can be used to identify the corresponding subject and object or relational arguments of the event in question. Furthermore, module 121 may use the graph output of SLING and training samples (e.g., based on the Proposition Bank schema) to generate text-based composition graphs for reasoning over spatio-temporal object-attribute relationships.

For parsing visual information, composition graph module 121 may pre-process video clips by running them through an additional set of detectors. In some examples, one or more videos are processed through a face detector, tracker, and attribute classifier, human pose and facial landmarks estimator, a monocular depth estimator, and a landmark detector for Simultaneous Localization and Mapping of the camera. Object detection may be employed (e.g., using YOLO9000) to detect humans and objects within the clip. Such detection provides context, enables composition graph module 121 to understand more about the surroundings of the actors and may be used to ground layouts (e.g., such as that illustrated in FIG. 1D). Composition graph module 121 may also detect human faces and facial attributes, such as gender, facial hair, and hair color within an image (e.g., using Facenet and/or MXNet). Facial detection enables composition graph module 121 to extract attributes of each actor (casting) and ground them within composition graph module 121. Composition graph module 121 also may detect movements, activities, poses, human skeletons, and/or facial landmarks (e.g., using OpenPose).

Composition module 121 may also perform camera pose tracking to track the camera's path throughout the scene's three-dimensional space. Composition graph module 121 may perform such tracking by detecting persistent landmark points and tracking those points within space, thereby enabling module 121 to understand the camera relationship with objects and actors and the camera's motion through the scene. Since visual information that is in the form of a movie is a two-dimensional projection of a three-dimensional world, composition graph module 121 may need to determine depth estimation within a representation of a scene, such as by using monocular depth estimation to detect the relative distance from the camera to objects and surfaces in each frame of the shot.

In the example of FIG. 1A and/or FIG. 1C, user input may be employed to further augment the training set 101 used to train composition graph module 121, and/or provide further supervised learning support. For example, dialogue manager 122 may output information about a training sample to device 170. Device 170 may present a user interface that includes aspects of the training sample (e.g., data 101A-T) presented alongside a video clip (e.g., 101A-V) associated with the training sample.

In some examples, such a user interface may enable word-token tagging and may include freeform text input components. Such text input components may enable a user of device 170 to mark different terms or create comments pertaining to a specific part of a text-based dataset. These user-provided annotations can also introduce an element of collaboration as the interface offers a visual indication of previously tagged terms, as well as a visualization of agreement amongst the uploaded entries. Sentences may be presented within the user interface as tokenized individual sentences and paragraphs to enable token-based tagging. The user interface may also prompt a user of device 170 for free-form input for further augmenting a training sample. The user interface may further include video annotation modules, enabling annotation of individual frames in a video clip: bounding boxes and polygons can be created to mark different on-screen entities, while landmark points can be used to represent skeletal and facial feature data. These annotations may be presented as overlays above the original frame, thereby allowing a user of device 170 to directly move and resize. In some examples, a visualization below a video clip may display a series of dots across a timeline, indicating occurrence and co-occurrence of individual entities over time.

Accordingly, device 170 may detect various types of input from a user seeking to augment training set 101. Device 170 may output information about the input to dialogue manager 122. Dialogue manager 122 may determine that the information corresponds to additional information about one or more training samples. In some examples, such information may include information mapping graph nodes to entities or objects. For instance, a character, such as "young John Smith," as depicted in one possible training sample, may be mapped to a "boy" based on user input, or other objects may be mapped to prop types (e.g., furniture, vegetation, decorations, etc.), also based on input of a user of device 170. Character attributes and prop attributes may also be mapped to attributes (e.g., a character's hair color, shirt color, height, or a table's color or shape) based on user input. Device 170 may also present a user interface that includes a selection of action or interactions, and based on user selections, a character action may be included within and mapped to appropriate scenes within a training sample.

Mappings may take the form of one-to one mappings ("young John Smith" maps to a single "boy" character), one-to-many mappings ("Principal's Office" maps to "Desk," "Chair," "Lamp," "Book," etc.), or many-to-many mappings (multiple nodes are understood to map to multiple objects, e.g. "Forrest walks over to the doctor" resolving to two character nodes and an action node). In some examples, composition graph module 121 may save such mappings and re-introduce them whenever they reoccur, meaning composition graph module 121 may also learn from such mappings, and use them to resolve recurring nodes.

Dialogue manager 122 may update training set 101 and/or cause graph module 121 to update a learning model based on additions to training set 101 derived from user input detected by device 170. When updating the learning model, composition graph 121 may, where appropriate, determine monocular depth values associated with a scene, and average them across an object's bounding box to determine the order of proximity to the camera relative to other objects in a scene.

Figure 2B:
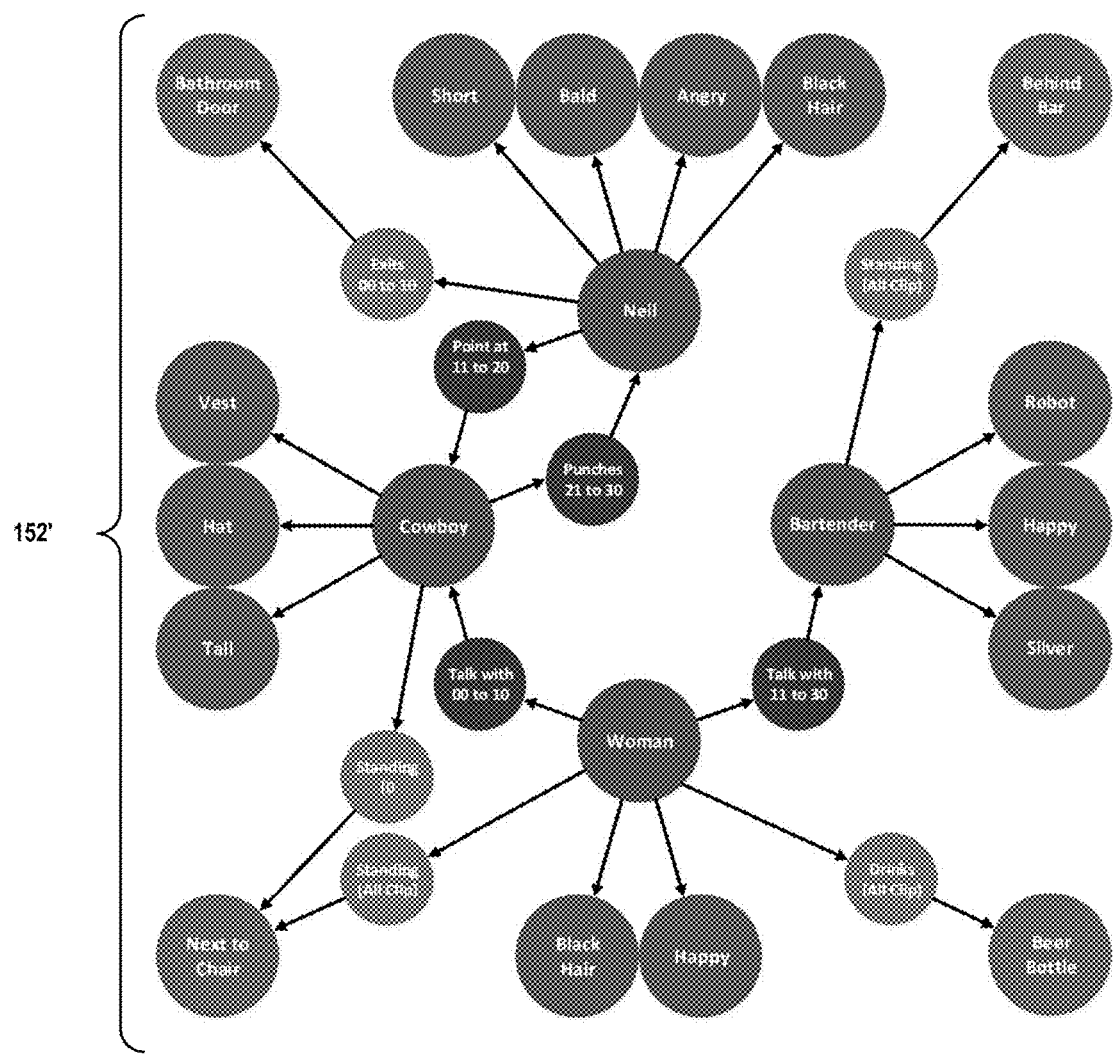
Figure 2C:
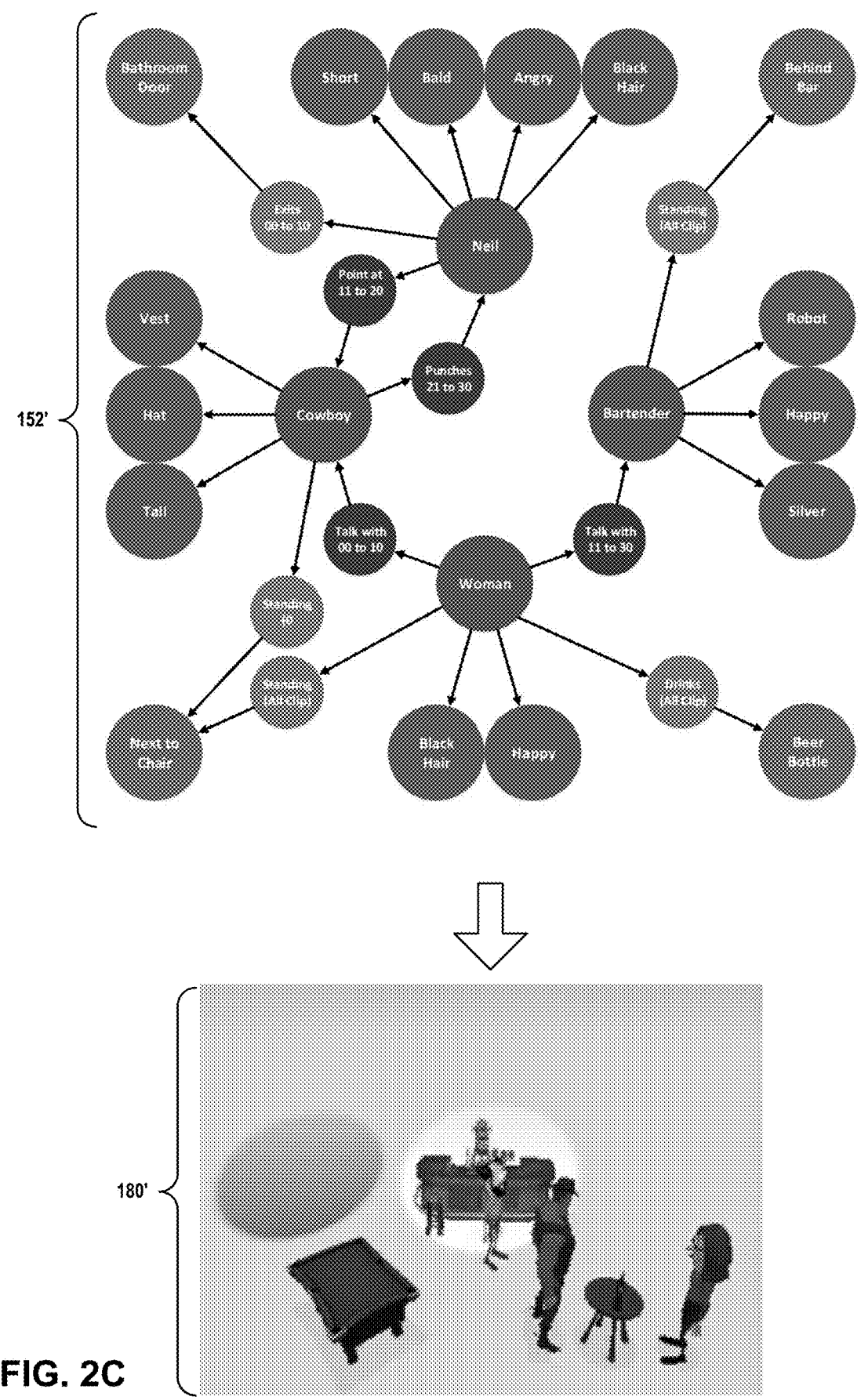

FIG. 2A, FIG. 2B, and FIG. 2C are conceptual diagrams illustrating conversion of text into an animation, in accordance with one or more aspects of the present disclosure. FIG. 2A illustrates textual scene information 112' and parsed text 117', which may each be examples of textual scene information 112 and parsed text 117 from FIG. 1C, respectively. In FIG. 2A, textual scene information 112' may be an excerpt from a movie script or other description of a sequence of events. Parsed text 117' corresponds to textual scene information 112' after identification and parsing of explicit events, with each event parsed into a relatively standardized form.

FIG. 2B illustrates parsed text 117' being converted into a spatio-temporal composition graph 152' (e.g., where composition graph 152' an example composition graph 152 from FIG. 1C), with nodes for each of the actors (e.g., Neil and Cowboy), props (e.g., bathroom door, beer bottle), and locations (e.g., behind bar, next to chair) in the scene. Each actor is associated with a number of attributes (e.g., the Cowboy has a vest, a hat, and is tall). Many different types of attributes may be represented in a composition graph, and attributes could relate not only to physical appearance or clothing worn by actors, but may also relate to location (e.g., elevation, planar coordinates, relative positioning), directional orientation, emotions expressed or felt, gestures and gesture or non-verbal communications, physical attributes of props, sizes, movement descriptions, and other attributes. Edges between objects (actors, props, locations) are shown as events (e.g., Neil points at Cowboy from time 11 to time 20) or relationships between objects (e.g., Woman standing next to chair).

FIG. 2C indicates that composition graph 152' can be translated into animation 180' (e.g., an example of animation 180 from FIG. 1C).

In accordance with one or more aspects of the present disclosure, textual scene information 112' may be translated into a composition graph. For instance, in an example that can be described with reference to FIG. 1C, language parser 118 detects textual scene information 112' in the form shown in FIG. 2A. Language parser 118 parses textual scene information 112' to generate parsed text 117' as shown in FIG. 2A. In parsed text 117', each of the six example events identified in textual scene information 112' are identified, and each may be described using a "who did what to whom" format. With reference to FIG. 1C and FIG. 2B, composition graph module 121 processes parsed text 117' to generate a composition graph. However, since textual scene information 112' of FIG. 2A does not include sufficient information to identify many details relating to the story, the composition graph initially generated by dialogue manager 122 might not include all of the details shown in composition graph 152' of FIG. 2B. For instance, textual scene information 112' of FIG. 2A does not indicate whether the Cowboy is wearing a hat, and even if the Cowboy is assumed to be wearing a stereotypical hat, other attributes of the Cowboy's appearance might not be identified (e.g., whether the Cowboy is wearing a vest, or is tall). Similarly, many details about Neil are also missing (height, hair color) from textual scene information 112'.

Accordingly, dialogue manager 122 of FIG. 1C may prompt a user for additional details relating to the story. In one such example, dialogue manager 122 sends output 116 to user interface device 170. User interface device 170 determines that output 116 includes a prompt for information. User interface device 170 presents a user interface, prompting a user of user interface device 170 for information. User interface device 170 detects input and outputs information about user input 114 to dialogue manager 122. Dialogue manager 122 and user interface device 170 may engage in further communications, resulting in additional user input 114. Dialogue manager 122 outputs to composition graph module 121 information about one or more instances of user input 114. Composition graph module 121 may determine that user input 114 resolves one or more ambiguities relating to the story. Composition graph module 121 may generate an updated composition graph 152' that includes further information about the story (e.g., specifying that the Cowboy is tall, and is wearing a vest).

In addition, input detected by sensor 171 may be incorporated into composition graph 152'. For instance, still referring to FIG. 1C and FIG. 2B, sensor 171 may detect input, and output non-text user input 115 to gesture and gaze tracking module 124. Gesture and gaze tracking module 124 may process non-text user input 115 and output information about non-text user input 115 to dialogue manager 122. Dialogue manager 122 may determine that non-text user input 115 corresponds to gesture and gaze tracking information relating to the story (e.g., specifying that Neil is looking at and pointing angrily at the Cowboy in the story). Dialogue manager 122 may output to composition graph module 121 information about the gesture and gaze tracking information. Composition graph module 121 may determine that the gesture and/or gaze tracking information further supplements information already available about the story. Composition graph module 121 updates composition graph 152' to reflect the additional information (e.g., specifying that Neil is looking at and pointing angrily at the Cowboy).

Based on composition graph 152', movie-making agent module 162 and animation software 169 may generate animation 180'. For instance, in the example of FIG. 1C and with reference to FIG. 2C, composition graph module 121 outputs composition graph 152' to movie-making agent module 162. Movie-making agent module 162 processes composition graph 152' using one or more of the movie-making agents described above. In some examples, the agents translate composition graph 152' into API calls that are fed to animation software 169, thereby causing animation software 169 to generate an animation, as represented by animation 180' in FIG. 2C.

Figure 3:
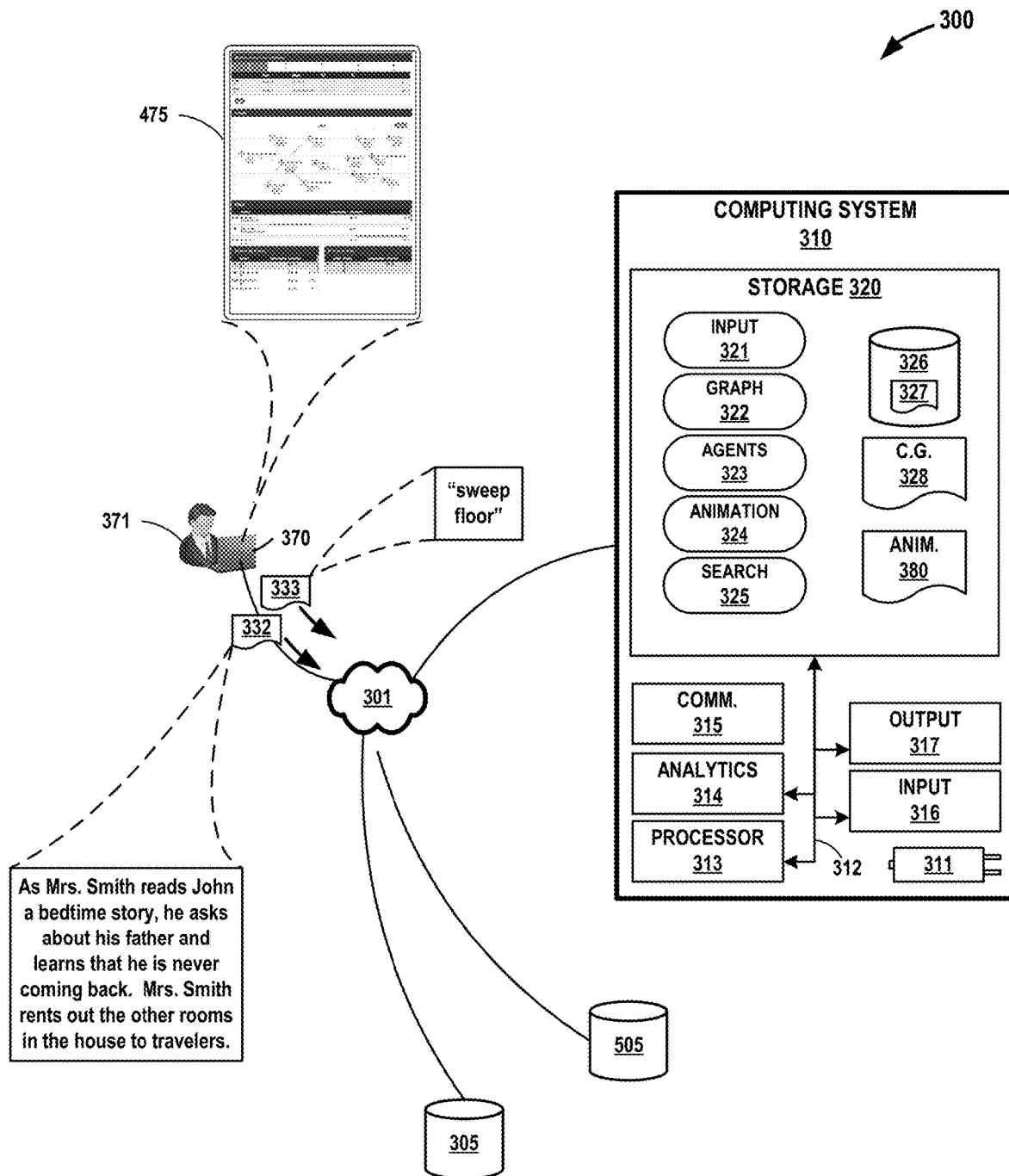
FIG. 3 is a block diagram illustrating an example system for converting scene information and user input into an animation, in accordance with one or more aspects of the present disclosure.

FIG. 3 is a block diagram illustrating an example system for converting text, a query, story information, and/or user input into an animation, in accordance with one or more aspects of the present disclosure. In FIG. 3, system 300 includes computing system 310, training data 305, video data store 505, and user interface device 370, all communicably coupled through network 301. For ease of illustration, one computing system 310, one user interface device 370, one training data 305, and one video data store 505 are illustrated in FIG. 3, although techniques in accordance with one or more aspects of this disclosure may be performed with many more of such systems or devices. Further, although illustrated as communicating through network 301, in other examples, one or more of computing system 310, training data 305, video data store 505, and user interface device 370 may be directly connected or combined. Similarly, user interface device 370 and/or computing system 310 could be distributed across multiple devices, and/or user interface device 370 may be part of computing system 310. In general, system 300 of FIG. 3 may be described as an example or alternative implementation of system 100A of FIG. 1A or system 100C of FIG. 1C, and one or more aspects of FIG. 3 may be described herein within the context of FIG. 1A and/or FIG. 1C.

User interface device 370 may be operated by user 371 and may present one or more user interfaces (e.g., user interface 475 of FIG. 4) at a display device associated with user interface device 370. User interface device 370 may correspond to user interface device 170 of FIG. 1A and/or FIG. 1C, and may be implemented as any suitable computing system, such as a mobile, non-mobile, wearable, and/or non-wearable computing device. User interface device 370 may, as further described herein, detect input (e.g., initiated by user 371) that may correspond to story information 332, search query 333, or another form of input. Information about such input may be communicated by user interface device 370 over network 301 to computing system 310, and computing system 310 may process such input in accordance with one or more techniques described herein.

Training data 305 may be a source of data and/or training samples for training one or more learning models executing at computing system 310. Training data 305 may correspond to training data 101 of FIG. 1A and FIG. 1C. In some examples, training data 305 represents a set of data that may be used, pursuant to a supervised or unsupervised learning techniques, to generate trained learning models that may be used on new or different data to classify, evaluate, predict, or interpret aspects of the new or different data. Training data 305 may include textual information, video information, and/or other types of information about training samples, such as training samples 101A through 101N that are illustrated in FIG. 1D. Training data 305 may, in some examples, be used as a source of implicit knowledge, enabling a trained machine learning model to accurately predict information or context about a scene or a story that might not be explicitly included in a description of that scene or story. In FIG. 3, training data 305 is shown as accessible by computing system 310 over network 301. In other examples, training data 305 may be included within or directly accessible to computing system 310.

Video data store 505 may be a repository of videos, animations, and/or other visual content. In some examples, a user of computing device 370 may seek to search for and identify a particular data item (e.g., a video file) within video data store 505. In such an example, computing system 310 may process input from a computing device 370 (e.g., corresponding to a search query 333) and attempt to identify one or more data items within video data store 370 that match criteria associated with input or textual search query detected at computing device 370. Such processing of a search query (e.g., search query 333) by computing system 310 may be performed as described in connection with FIG. 5A, FIG. 5B, FIG. 6A and/or FIG. 6B.

Network 301 may be the internet, or may include or represent any public or private communications network or other network. For instance, network 301 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 301 using any suitable communication techniques. Network 301 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 3 may be operatively coupled to network 301 using one or more network links. The links coupling such devices or systems to network 301 may be Ethernet, Asynchronous Transfer Mode (ATM) or other types of network connections, and such connections may be wireless and/or wired connections. One or more of the devices or systems illustrated in FIG. 3 or otherwise on network 301 may be in a remote location relative to one or more other illustrated devices or systems.

Computing system 310 may serve as a machine learning system, and may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 310 may be an example or alternative implementation of computing system 110 of FIG. 1A. In some examples, computing system 110 represents a cloud computing system, server farm, and/or server cluster (or portion thereof) that provides services to client devices and other devices or systems. In other examples, computing system 310 may represent or be implemented through one or more virtualized compute instances (e.g., virtual machines, containers) of a data center, cloud computing system, server farm, and/or server cluster.

In the example of FIG. 3, computing system 310 may include power source 311, one or more processors 313, one or more behavior analytics systems 314, one or more communication units 315, one or more input devices 316, and one or more output devices 317. One or more of the devices, modules, storage areas, or other components of computing system 310 may be interconnected to enable inter-component communications (physically, communicatively, and/or operatively). In some examples, such connectivity may be provided by through communication channels (e.g., communication channels 312), a system bus, a network connection, an inter-process communication data structure, or any other method for communicating data.

Power source 311 may provide power to one or more components of computing system 310. Power source 311 may receive power from the primary alternating current (AC) power supply in a building, home, or other location. In other examples, power source 311 may be a battery or a device that supplies direct current (DC).

One or more processors 313 of computing system 310 may implement functionality and/or execute instructions associated with computing system 310 or associated with one or more modules illustrated herein and/or described below. One or more processors 313 may be, may be part of, and/or may include processing circuitry that performs operations in accordance with one or more aspects of the present disclosure. Examples of processors 313 include microprocessors, application processors, display controllers, auxiliary processors, one or more sensor hubs, and any other hardware configured to function as a processor, a processing unit, or a processing device. Computing system 310 may use one or more processors 313 to perform operations in accordance with one or more aspects of the present disclosure using software, hardware, firmware, or a mixture of hardware, software, and firmware residing in and/or executing at computing system 310.

One or more behavior analytics systems 314 may be, or may include, a camera, a sensor, or a set of cameras or sensors, or any appropriate type of image acquisition or other device enabling detection of movements, posture, poses, gestures, actions, positions, and/or gaze orientations, directions, durations, and persistence. In some examples, behavior analytics system 314 may utilize a user's gestures and gaze in concert with verbal utterances to manipulate the objects and characters, as represented by composition graph 328 or animation 380. One implementation of behavior analytics system 314 may use Microsoft Kinect as the underlying sensor enabling tracking of gestures, gaze, movements, posture, and poses. Behavior analytics system 314 may provide a high resolution RGB video stream, a 3D depth video stream of a subject (e.g., a user), and a high quality audio stream via an onboard microphone. In general, behavior analytics systems 314 may receive input from any type of camera, button, sensor, mobile input device, control pad, microphone, presence-sensitive screen, network, or any other type of device for detecting movements, poses, gestures, actions, positions, and/or gaze information from a human or machine. In some examples, behavior analytics system 314 may include one or more sensor components one or more location sensors (GPS components, Wi-Fi® components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

In some examples, a subject (or user) may interact with behavior analytics system 314 by sitting or standing in front of a large screen (TV or projection). Behavior analytics system 314 is illustrated as being included within computing system 310, but some or all of the components of behavior analytics system 314 may be included within user interface device 370 (or distributed across network 301 to user interface device 370), so that user 371 may act as the subject for behavior analytics system 314. In other examples, a different user may act as a subject.

In operation, a subject performs perform various gestures (e.g., emblematic gestures) and three-dimensional deictic gestures arising from the subject pointing at props, an object, or other items and arising from subject's gaze on screen. Agents module 323 and/or animation module 324 may control or interact with an object stream representing an animation, and integrate with bounding boxes represented within an animation. Animation module 324 may, for example, project three-dimensional deictic vectors from the deixis and gaze onto a display (e.g., output device 317) illustrating an animation. Animation module 324 may enable identification of objects of reference and objects of attention within the animation or within the subject's space, thereby enabling efficient resolution of references to specific objects and locations within the actual space near the subject or within an animation to place actors, props, and/or other objects where the subject or user wants the objects to be placed. Animation module 324 may enable a subject to explicitly define and/or draw paths for object and actor trajectories. For noisier venues, a wireless lapel microphone may alternatively, or in addition, be used for the audio stream.

One or more communication units 315 of computing system 310 may communicate with devices external to computing system 310 by transmitting and/or receiving data, and may operate, in some respects, as both an input device and an output device. In some examples, communication unit 315 may communicate with other devices over a network. In other examples, communication units 315 may send and/or receive radio signals on a radio network such as a cellular radio network. In other examples, communication units 315 of computing system 310 may transmit and/or receive satellite signals on a satellite network such as a Global Positioning System (GPS) network. Examples of communication units 315 include a network interface card (e.g. such as an Ethernet card), an optical transceiver, a radio frequency transceiver, a GPS receiver, or any other type of device that can send and/or receive information. Other examples of communication units 315 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 316 may represent any input devices of computing system 310 not otherwise separately described herein. One or more input devices 316 may generate, receive, and/or process input from any type of device capable of detecting input from a human or machine. For example, one or more input devices 316 may generate, receive, and/or process input in the form of electrical, physical, audio, image, and/or visual input (e.g., peripheral device, keyboard, microphone, camera).

One or more output devices 317 may represent any output devices of computing system 310 not otherwise separately described herein. One or more output devices 317 may generate, receive, and/or process input from any type of device capable of detecting input from a human or machine. For example, one or more output devices 317 may generate, receive, and/or process output in the form of electrical and/or physical output (e.g., peripheral device, actuator).

One or more storage devices 320 within computing system 310 may store information for processing during operation of computing system 310. Storage devices 320 may store program instructions and/or data associated with one or more of the modules described in accordance with one or more aspects of this disclosure. One or more processors 313 and one or more storage devices 320 may provide an operating environment or platform for such modules, which may be implemented as software, but may in some examples include any combination of hardware, firmware, and software. One or more processors 313 may execute instructions and one or more storage devices 320 may store instructions and/or data of one or more modules. The combination of processors 313 and storage devices 320 may retrieve, store, and/or execute the instructions and/or data of one or more applications, modules, or software. Processors 313 and/or storage devices 320 may also be operably coupled to one or more other software and/or hardware components, including, but not limited to, one or more of the components of computing system 310 and/or one or more devices or systems illustrated as being connected to computing system 310.

In some examples, one or more storage devices 320 are temporary memories, meaning that a primary purpose of the one or more storage devices is not long-term storage. Storage devices 320 of computing system 310 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 320, in some examples, also include one or more computer-readable storage media. Storage devices 320 may be configured to store larger amounts of information than volatile memory. Storage devices 320 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

In some examples, input processing module 321 may handle or process directives given by a human user, the mapping from natural language input to the corresponding composition graph as output. Input processing module 321 may model the distribution over composition graphs using a probabilistic And-Or graph. In some examples, composition graphs may be considered deterministic, but directives given in natural language are ambiguous in nature, and can be refined gradually via communication. Therefore, it may be advantageous for input processing module 321 to use a probabilistic model. Further, a probabilistic model enables learning and inference of composition graphs by learning the parameters of the probabilistic model from annotated data of movies as well as preferences of the human, ultimately leading to the goal of a mixed-initiative system. In correspondence with the different types of nodes in composition graphs and as further described in connection with agents module 323, an And-Or graph model may be divided in to four agents: a casting agent, a set design agent, an animation agent, and a camera agent.

Graph module 322 may perform functions relating to generating data structures representing a sequence of events or a story. In some examples, the data structures may be spatio-temporal composition graphs generated from input data. Graph module 322 may use machine learning techniques to generate one or more composition graphs 328 from input data. Accordingly, graph module 322 may be trained pursuant to supervised or unsupervised machine learning techniques, and may occasionally or continually update its parameters to incorporate feedback from users of device 370 about predicted composition graphs. Using such feedback, module 322 may, over time, become more effective at generating data composition graphs that accurately represent textual information, video information, and other information about stories or descriptions of event sequences. Further, graph module 322 may apply implicit knowledge about concepts to add details to predicted composition graphs, where such details are not explicitly provided in the information about a specific story or event sequence.

Graph module 322 may perform a number of instantiations such as spawning actors, changing their attributes and locations, animating various motions with emotional modifiers, manipulating multiple cameras and capturing video. Graph module 322 may incrementally build the graph in response to a user's natural language commands. Graph module 322 may extract relationships from the output of a language parser and add (or remove) nodes in composition graph 328 with appropriate prior probability distributions. When composition graph 328 is missing information, graph module 322 may decide whether to prompt the user for a clarification versus sampling from a probabilistic model. Parameters of an underlying probabilistic model used by graph module 322 can be learned from examples of prototypical scenes and animations. In some examples, graph module 322 may prompt a user for a starting scene and a goal scene, and graph module 322 then uses artificial intelligence planning to transform the starting scene to the goal scene. Composition graph 328 may be used for natural language generation, enabling high level conversation such as a movie summary. Graph module 322 may receive information from and output information to one or more other modules, and may otherwise interact with and/or operate in conjunction with one or more other modules of computing system 310. Although graph module 322 may be described in connection with FIG. 3 as primarily performing operations relating to composition graphs and identifying ambiguities and/or updating composition graphs, graph module 322 may alternatively, or in addition, perform other operations relating to interpreting input or aspects of a story, or relating to generation of an animation or data underlying an animation.

Agents module 323 may perform functions relating to interacting with animation module 324 to generate an animation. In some examples, agents module 323 may implement various movie-making agents, including agents configured or designed to perform casting, set-design, or animation functions. Agents module 323 may further implement agents for configuring attributes or characteristics of various camera or photography techniques (angles, lighting, types of cameras).

Animation module 324 may perform functions relating to generating animations or movies from a data structure. Given one or more composition graphs 328, animation module 324 may instantiate a possible movie corresponding to a grounded state within a 3D engine, which may involve raw coordinates, timings, and textures. In some examples, animation module 324 may include interactive three-dimensional animation software. In such an example, animation module 324 may be implemented similar to an actual movie production pipeline, yet may eliminate many of the barriers associated with the creation of an animated film. Animation module 324 may include a library of assets enabling rapid assembly of a scene, and may enable a user (e.g., user 371) to select characters, customize their appearance, position cameras and lights around the set to prepare for the scene's key shots, issue directions to the actors, and record on-screen action in near or seemingly-near real time. Animation module 324 may include mechanisms for associating attributes to objects, actors, and props including lighting effects and mood-based modifiers (e.g., an actor pointing angrily vs. with fright). Animation module 324 may include mechanisms for configuring shots layered with visual and audio effects, voice tracks, and music and mechanisms for generating an animation, video, or a file or other data underlying animation or video. Animation module 324 may expose objects and/or internal assets via an API, enabling interaction with other modules, such as agents module 323 and/or graph module 322. In one example, animation module 324 may be or include the Muvizu software developed by Meshmellow of Shanghai, China (see www.muvizu.com). Animation module 324 may alternatively, or in addition, perform functions relating to generating an animation by applying other techniques, such as a generative adversarial network or a dense validation generative adversarial network (e.g., see FIG. 5B and/or FIG. 6B).

Search module 325 may perform functions relating to performing a search of a database of videos using an animation generated by animation module 324. In some examples, search module may perform a search of video data store 505 by first receiving a video clip or an amination of motion from animation module 324, and then using the received video clip or animation of motion to identify similar videos with video data store 505. Such a procedure may provide transparency into the process by which computing system 310 performs the search, enabling users to have an understanding of the models' conceptualization of the search query, which may facilitate a user's ability to rely on or reject the results of the search.

Composition graph 328 may be data underlying a directed graph representation of a scene or sequence of events. Effectively communicating about any given story may require graph module 322 to be able reason about the spatio-temporal and object-attribute relationships within the animation. For example, the sentence 'The Cowboy punched Neil because of his argument with the Bartender', might describe an animation that consists of multiple scenes that are succinctly captured in one or more composition graphs 328. Accordingly, composition graph 328 may be used to represent the spatio-temporal and object-attribute relationships within a scene, and composition graph 328 may therefore serve as an intermediate representation used by graph module 322 and between natural language and the visual domain. In some examples, composition graph 328 may illustrate how actors and props are associated with their attributes, spatial relationships, and temporal relationships such as interactions with other actors and actions. Computing system 310 may use composition graph 328 as a core representation of the corresponding scene, and may use composition graph 328 to implement a two-way interface between each object within a composition graph. In some examples, a training set may be used to ground composition graphs generated by graph module 322 and translated into animations by animation module 324. Composition graph 328 may include information about various objects, including actors associated with attributes, spatial relationships with props, temporal relationships such as interactions with other actors, and actions. Graph module 322 may generate composition graph 328 as a probabilistic graphical model using one or more probabilistic modeling libraries (e.g., Edward) in connection with a dataflow programming libraries (e.g., TensorFlow). The composition graph may, in some examples, represent an abstraction of a story since multiple clips can be instantiated using the graph representation (e.g. varying the relative location and attributes of actors and objects, camera view ports).

Animation 380 may represent data corresponding to an animation, a video, or other representation of a story. In some examples, animation 380 may be a file stored in a file system, generated by animation module 324. Animation 380 may be generated based on data included within a composition graph. Further, animation 380 may be editable, such as by animation module 324, based on changes made to a composition graph or otherwise. In some examples, animation 380 may be generated for the purpose of facilitating an interactive storytelling session involving a user of computing device 370. In other examples, animation 380 may be generated for the purpose of identifying, in an explainable way, videos that are relevant to a text query detected as input at computing device 370.

Data store 326 may represent any suitable data structure or storage medium for storing information related to composition graphs, training sets for machine learning techniques, parameters derived as a result of training a machine learning system, search results, animations, generated animations, and source data that can be used by a machine learning system (e.g., graph module 322) to generate a composition graph. The information stored in data store 326 may be searchable and/or categorized such that one or more modules within computing system 310 may provide an input requesting information from data store 326, and in response to the input, receive information stored within data store 326. Data store 326 may be primarily maintained by graph module 322, although other modules may administer data within data store 326. Data store 326 may provide other modules with access to the data stored within data store 326, and/or may analyze the data stored within data store 326 and output such information on behalf of other modules of computing system 310.

In the example of FIG. 3, and in accordance with one or more aspects of the present disclosure, computing system 310 may train graph module 322 to generate composition graphs 328 from input data. For instance, in an example that can be described with reference to FIG. 3, communication unit 315 of computing system 310 detects a signal and outputs an indication of the signal to graph module 322. Graph module 322 determines that the signal includes information from training data 305 that can be used to train, using machine learning techniques, graph module 322 to generate composition graphs 328 in response to input data. Graph module 322 may store some or all of the training data information in data store 326. In some examples, the data stored in data store 326 may include data appropriate for training graph module 322 pursuant to supervised machine learning techniques, such that the data includes a number of sets of input data and a corresponding composition graph that would be appropriate for each set of input data. In other examples, the data may include data appropriate for training graph module 322 pursuant to unsupervised machine learning techniques. Graph module 322 uses the training data to generate a set of machine learning parameters that graph module 322 may thereafter use for accurately generating one or more composition graphs 328 from new input data that is not included within the training data. Graph module 322 stores information about the parameters in data store 326 for later use.

After graph module 322 is trained with training data 305, graph module 322 may generate one or more composition graphs 328 from new input data. For instance, in an example that can be described in connection with FIG. 3, communication unit 315 detects input over network 301 and outputs to input processing module 321 an indication of input. Input processing module 321 determines that the input corresponds to information that can be used to generate a data structure describing or specifying a sequence of events or a scene. Input processing module 321 stores the information in data store 326 as source data 327. In some examples, source data 327 may include information corresponding to textual scene information 112, non-text story information 113, user input 114 and/or non-text user input 115 of FIG. 1C. Accordingly, source data 327 may include commands, parsed speech, textual information, non-verbal information (e.g., movement, gesture, and gaze-tracking data), and/or information resulting from exchanges with user 371 operating user interface device 370. Input processing module 321 may output information about source data 327 to graph module 322. Alternatively, or in addition, graph module 322 may access source data 327 in data store 326. Graph module 322 generates, based on source data 327 and using parameters identified during a learning process, composition graph 328. Composition graph 328 may, as with composition graph 152 of FIG. 1C, serve as an intermediate representation between text, natural language, and non-verbal (e.g. gesture information) and the visual domain. Graph module 322 causes agents module 323 to interact with animation module 324 to generate animation 380. Accordingly, in the example of FIG. 3, composition graph 328 may sufficiently specify attributes of a scene to enable animation module 324 to generate one or more possible appropriate animations corresponding to source data 327.

In some examples, computing system 310 may interact with a user of user interface device 370 to collect further information and/or resolve ambiguities relating to source data 327. For instance, still referring to FIG. 3, graph module 322 may cause communication unit 315 to output a signal over network 301. User interface device 370 may detect a signal and determine that the signal includes information to present or update a user interface at user interface device 370. User interface device 370 presents a user interface at user interface device 370 prompting user 371 for information. User interface device 370 detects input and outputs a signal over network 301. Communication unit 315 of computing system 310 detects a signal and outputs to graph module 322 information that graph module 322 determines corresponds to input from a user of user interface device 370. Graph module 322 updates composition graph 328 to reflect the input from a user of user interface device 370. In some examples, the input from user interface device 370 may correspond to a command, entered by user 371, adding an attribute or object to a scene that user 371 seeks to model with animation 380. In another example, the input from user interface device 370 may correspond to a response to a prompt that graph module 322 communicated to user interface device 370 to, for example, assist graph module 322 in resolving an ambiguity identified by graph module 322 when generating composition graph 328 from source data 327.

In some examples, behavior analytics system 314 may interact with a user of user interface device 370 using behavior analytics system 314. For instance, in one example, behavior analytics system 314 tracks a fully-articulated 3D skeleton of a subject or user via a sensor's 3D-depth data. In the example of FIG. 3, behavior analytics system 314 performs such tracking remotely, through components of behavior analytics system 314 integrated within user interface device 370. In another example, a subject of the tracking is local to computing system 310. Continuing with the example being described, behavior analytics system 314 outputs information about the skeleton to input processing module 321. Input processing module 321 uses the information to recognize gestures made by the individual including emblematic, deictic, and iconic gestures. Behavior analytics system 314 uses a head node of the skeleton to extract the Region Of Interest (ROI) of the head/face from the high resolution RGB video. Behavior analytics system 314 outputs information about the ROI to input processing module 321. Input processing module 321 uses the information to track the head pose (orientation) as well as landmarks on the subject's face, and to recognize affective and communicative facial expressions. Input processing module 321 may also use head pose tracking to identify communicative gestures such as head nods and head shakes. Input processing module 321 may further track a subject's iris and eye pupil to determine 3D eye gaze vectors in conjunction with the head pose.

Behavior analytics system 314 may also detect an audio stream. In such an example, behavior analytics system 314 may detect audio input and output information about the audio stream to input processing module 321. Input processing module 321 may use the information to perform speech recognition and generate text input for a conversational interface. Input processing module 321 may also perform paralinguistic analysis to identify attributes such as loudness, pitch, speaking rate, prosody of the subject's (or any other person's) speech. Input processing module 321 may use such signals to add to the verbal input to focus attention on certain parts of the utterance and also to transmit affect.

Graph module 322 may update composition graph 328 based on tracking and audio information collected by behavior analytics system 314. For instance, input processing module 321 outputs to graph module 322 information about the information collected (e.g., tracking the subject) by behavior analytics system 314. Graph module 322 updates composition graph 328, based on the information, to reflect the information about the tracking. Agents module 323 may thereafter cause animation module 324 to generate or update animation 380.

Modules illustrated in FIG. 3 (e.g., input processing module 321, graph module 322, agents module 323, animation module 324) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4:
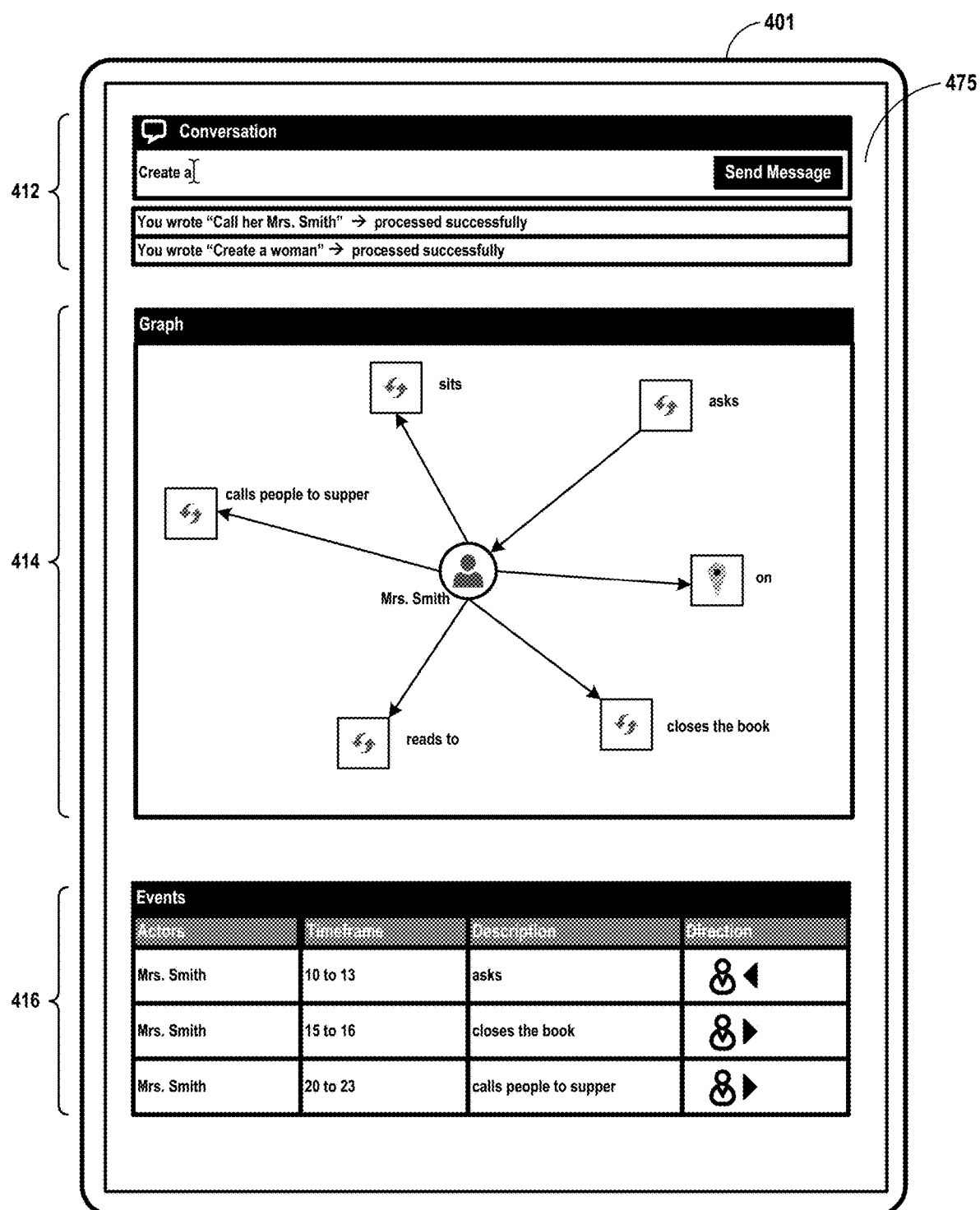
FIG. 4 is a conceptual diagram illustrating an example user interface presented by a user interface device, in accordance with one or more aspects of the present disclosure.

FIG. 4 is a conceptual diagram illustrating an example user interface presented by a user interface device in accordance with one or more aspects of the present disclosure. User interface 475, as illustrated in FIG. 4, may correspond to a user interface presented by one or more of user interface devices 170 of FIG. 1A or FIG. 1C, or by user interface device 370 of FIG. 3, and may provide a mechanism for a user (e.g., user 371 of FIG. 3) to engage in a conversation with a computing system (e.g., computing system 310 of FIG. 3) to instantiate an animation from commands, interactions, and other information about a story. Although user interface 475 is shown as a graphical user interface, other types of interfaces may be presented in other examples, including a text-based user interface, a console or command-based user interface, a voice prompt user interface, or any other appropriate user interface. One or more aspects of FIG. 4 may be described herein within the context of FIG. 3.

In accordance with one or more aspects of the present disclosure, user interface 475 may be presented at a user interface device. For instance, with reference to an example that can be described in the context of FIG. 3 and FIG. 4, user interface device 370 detects input and outputs a signal over network 301. Communication unit 315 of computing system 310 detects a signal and outputs to input processing module 321 an indication of a signal. Input processing module 321 determines that the signal includes a request to generate an animation. Input processing module 321 causes communication unit 315 to output a signal over network 301. User interface device 370 detects a signal over network 301 and determines that the signal includes information sufficient to present a user interface. User interface device 370 presents user interface 475 at a display associated with user interface device 370 as illustrated in FIG. 4.

In FIG. 4, user interface 475 includes command line interface 412, composition graph representation 414, and event information 416. Command line interface 412 may enable a user to submit commands, to be processed by an input or text parser, and which may cause updates to a composition graph maintained by a computing system. In the example of FIG. 4, command line interface 412 may include a running commentary of prior commands submitted by a user, and may indicate the effect of such commands, or whether such commands were successful. Composition graph representation 414 presents a composition graph, which may reflect the current state of a parsing of story information by a computing system (e.g., computing system 310), or may reflect the current state of an exchange between a computing system and a user. In some examples, nodes and/or edges within the composition graph depicted by composition graph representation 414 may be colored, shaded, or otherwise presented to indicate node or event type (e.g., actors, props, attributes, actions, relationships). User interface 475 may include additional information about the story or about the composition graph, such as event information 416, and may enable editing of events within the story through direct interactions with user interface 475. In other examples, user interface 475 may include editable information about actors, actions, props, and positions or locations of such objects. Similarly, user interface 475 may also include editable information about relationships between actors or props, or editable information about events occurring in the story.

In some examples, user interface 475 represents an example of a set of user interfaces 475 through which user 371 communicates with computing system 310, and through which computing system 310 presents a current state of composition graph 328. For instance, and in general, a user operating user interface device 370 (e.g., user 371) may interact with user interface 475, and engage with or utilize the tools provided by computing system 310, and thereby receive corresponding animations based on an interpretation of the user's interactions. User interface 475 may represent a platform-agnostic interface that is built on popular web technologies and hosted on a publicly accessible server. User interface 475 (and one or more related user interfaces) may allow users to interact with computing system 310 without the need to use a dedicated client application. One or more of user interfaces 475 may feature a familiar chat window similar to today's messenger applications, enabling a user to submit text input. Such input may then be committed to a data store (e.g., data store 326), which may then trigger input processing module 321 and/or graph module 322 to utilize a language parser to parse the text. Upon completion, input processing module 321 may respond with a series of messages describing its parsing process. Input processing module 321 may cause user interface device 370 to prompt, through a user interface, the user to review the results: a composition graph displaying various nodes and edges representative of the scene as described by the user, and in some examples, a reconstruction of the very same scene generated by animation module 324. User 371 may then choose to continue interacting with computing system 310 using the chat window, or directly interact with the resultant nodes and edges (corresponding to an internal state maintained by computing system 310) to further refine a composition graph presented within one or more user interfaces 475.

User interface 475 may be updated based on user interactions with user interface 475. For instance, again with reference to FIG. 3 and FIG. 4, user interface device 370 detects input and outputs a signal over network 301. Communication unit 315 detects a signal that input processing module 321 determines corresponds to a command to instantiate one or more actors. Graph module 322 instantiates one or more actors and generates composition graph 328. Graph module 322 causes communication unit 315 to output a signal over network 301. User interface device 370 detects a signal that it determines corresponds to a command to update composition graph representation 414 within user interface 475 being presented at user interface device 370. Communication unit 315 may detect further signals that input processing module 321 determines corresponds to story information 332. Graph module 322 may, in response to story information 332, further update composition graph 328, and communicate with user interface device 370 to cause user interface 475 to be further updated. Graph module 322 may still further interact with a user of user interface device 370, through user interface 475, and update composition graph 328, composition graph representation 414 and/or event information 416 as additional information is gathered about the story.

An animation may be generated based on information reflected within user interface 475. For instance, still referring to the examples of FIG. 3 and FIG. 4, user interface device 370 detects input and outputs a signal over network 301. Computing system 310 detects a signal that input processing module 321 determines corresponds to a request to generate an animation based on the commands information previously entered using command line interface 412 and further based on composition graph 328, which is reflected within user interface 475 (i.e., composition graph representation 414). Graph module 322 causes agents module 323 to interact with animation module 324 to generate animation 380.

Computing system 310 may output information about animation 380 over network 301. For instance, again referring to FIG. 3, user interface device 370 may detect a signal over network 301 that it determines corresponds to information about animation 380. User interface device 370 may present animation 380 at user interface device 370 for viewing by user 371.

Figure 5A:
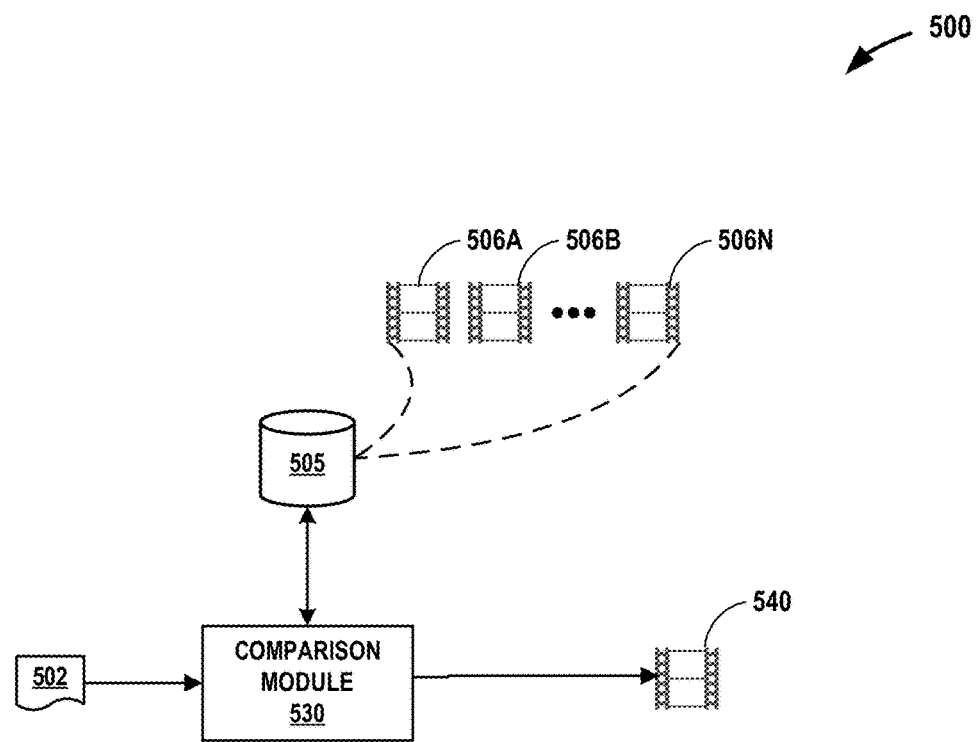
FIG. 5A and FIG. 5B illustrate systems for identifying, based on a query, relevant videos from a database of videos by performing a discriminative ranking process, in accordance with one or more aspects of the present disclosure.
Figure 5B:
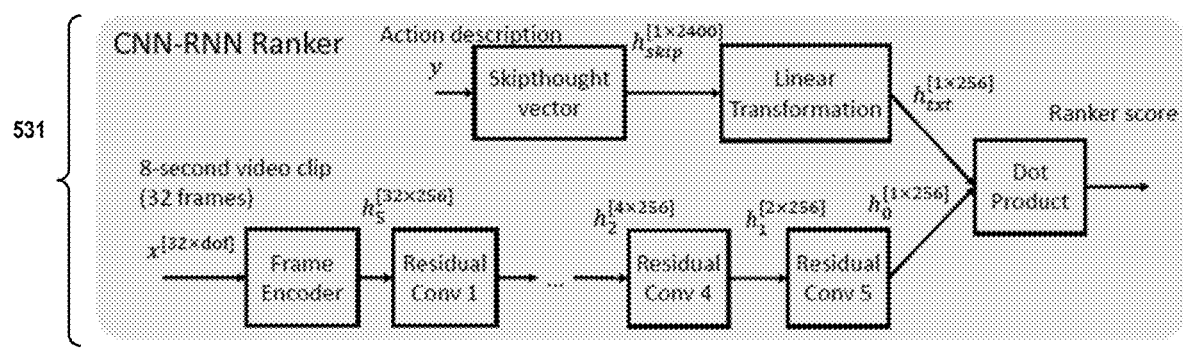

FIG. 5A and FIG. 5B illustrate systems for identifying, based on a query, relevant videos from a database of videos by performing a discriminative ranking process, in accordance with one or more aspects of the present disclosure. Specifically, the example of FIG. 5A is a conceptual diagram illustrating an example system for identifying, based on a textual query, relevant videos from a database of videos, where the system does not readily provide information that explains how the system has identified relevant videos. The example of FIG. 5A illustrates system 500 including comparison module 530 having access to video data store 505. Video data store 505, which may correspond to video store 505 of FIG. 3, includes videos 506A through 506N (collectively "videos 506," and corresponding to any number of videos). Comparison module accepts textual query 502, compares textual query 502 to information about each of the videos 506 stored within video data store 505, and identifies one or more relevant videos 540.

In some examples, comparison module 530 uses a deep CNN-RNN, as further described below and illustrated in FIG. 5B, to encode a fixed-length video clip from database 505 using a CNN. Comparison module 530 encodes text query 502 using a RNN and computes a score of how well each video clip in data store 505 matches the query. In some examples, a long video is partitioned into multiple fixed-length clips and the scores are averaged over the entire video.

FIG. 5B is a conceptual diagram illustrating a CNN-RNN discriminative ranking model that may correspond to comparison module 530 of FIG. 5A. The model includes a CNN-RNN Ranker 531 that reads a query and a video and produces a score. The scores for each of videos 506A through 506N are sorted to provide a ranking. In some examples, ranker 531 may encode one or more from data store 505 into a vector using a CNN, encode textual query 502 into a vector using an RNN, and then predict their dot product as a matching score between the action description and the video clip. The CNN is a one-dimensional residual convolution network. The RNN is a skipthought vectors RNN pre-trained using a data set (e.g., the BookCorpus dataset.) In some examples, the CNN-RNN discriminative ranking model is trained jointly for action classification and retrieval of human activity videos. The action classification task is the following: given a fixed-length video clip, retrieve its original description from a pool of descriptions (e.g., where K=250). Similarly, the action retrieval task is the following: given an action description, retrieve the video clip that corresponds to the action description from the pool of fixed-length video clips (e.g., where K=250). In one example, the system illustrated in FIG. 5B may optimize the negative log-likelihood action retrieval and action classification losses to learn parameters of the CNN, with Adam optimizer with learning rate $1\times10^{-4}$ over 100 epochs.

As described, the discriminative ranking system illustrated in FIG. 5A (and further illustrated in FIG. 5B), typically does not provide an explanation of how its decision. A user of such a system may need to depend on decisions (e.g., decisions relating to identifying appropriate videos in response to a search query) made by system 500. Accordingly, it may be advantageous to be able to explain or understand decisions made by system 500, so that when such a system is used, end users would be able understand, appropriately trust, and effectively manage its decisions. At least occasionally, some of the more opaque aspects of systems relate to the artificial intelligence and/or machine learning techniques employed by the system, and there can be an inherent tension between machine learning performance (predictive accuracy) and explainable characteristics of a system. Sometimes, high performing methods, such as deep learning, are the least explainable, while more explainable methods, such as decision trees, are less accurate.

An effective explainable artificial intelligence system ("XAI") system will typically maintain performance quality while also being explainable. In such a system, the end user who depends on decisions, recommendations, or actions produced by the XAI system will preferably understand at least aspects the rationale for the system's decisions. For example, a test operator of a newly developed autonomous system will need to understand why the system makes its decisions so that the text operator can decide how to use it in the future. Accordingly, at least some successful XAI systems may provide end users with an explanation of individual decisions, enable users to understand the system's overall strengths and weaknesses, convey an understanding of how the system will behave in the future, and perhaps how to correct the system's mistakes.

The discriminative ranking system illustrated in FIG. 5A and FIG. 5B may use a query to retrieve videos containing or corresponding to the query, and may highlight portions of the retrieved videos that may include or correspond to the query. However, in a different system that departs from the discriminative ranking system an effective XAI system may follow a paradigm of explanation by generation. In such a system, a generative ranking framework may be used that uses the query to generate multiple video hypotheses corresponding to or representing the query, and then searches for matching videos using the model-generated videos. In such an example, by having the model generate the visual hypothesis information, the user may can use the visual hypothesis information to gain an insight on what the model "thinks" the query looks like, hence, it becomes more explainable. In some examples, model may use a Generative Adversarial Network (GAN) for human motion animation generation from text, where such human motion animations serve as the visual hypothesis information.

Figure 6A:
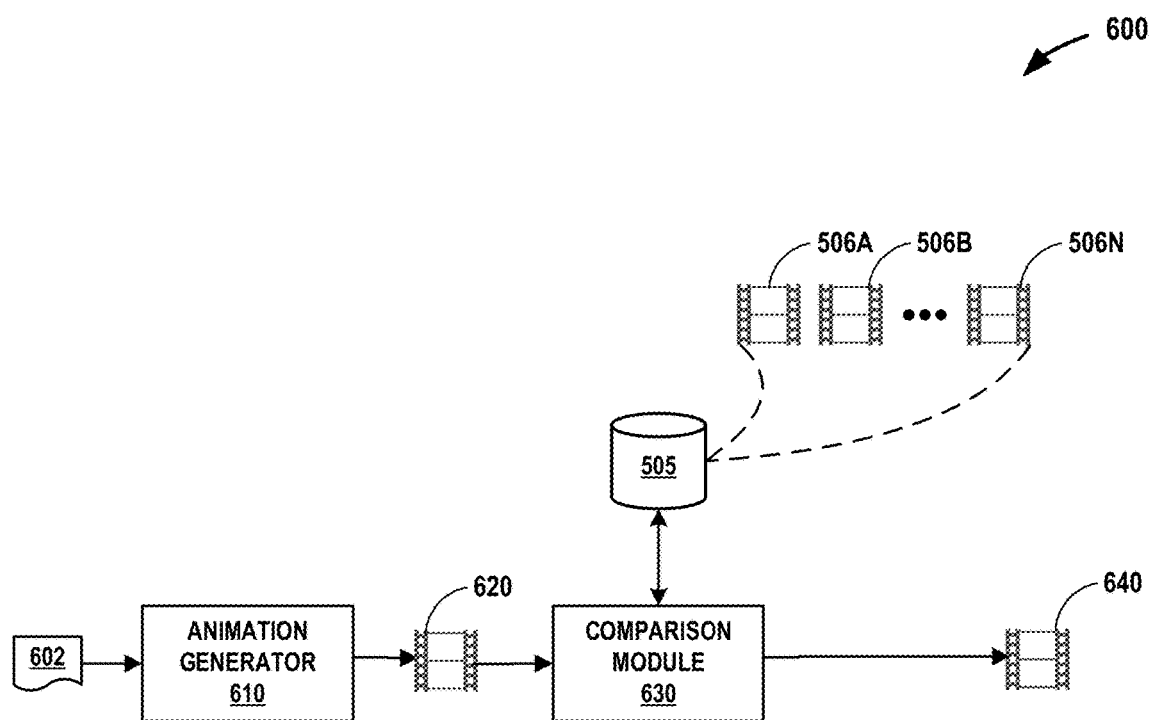
FIG. 6A, and FIG. 6B illustrate systems for identifying, based on a query, relevant videos from a database of videos by performing a generative ranking process, in accordance with one or more aspects of the present disclosure.
Figure 6B:
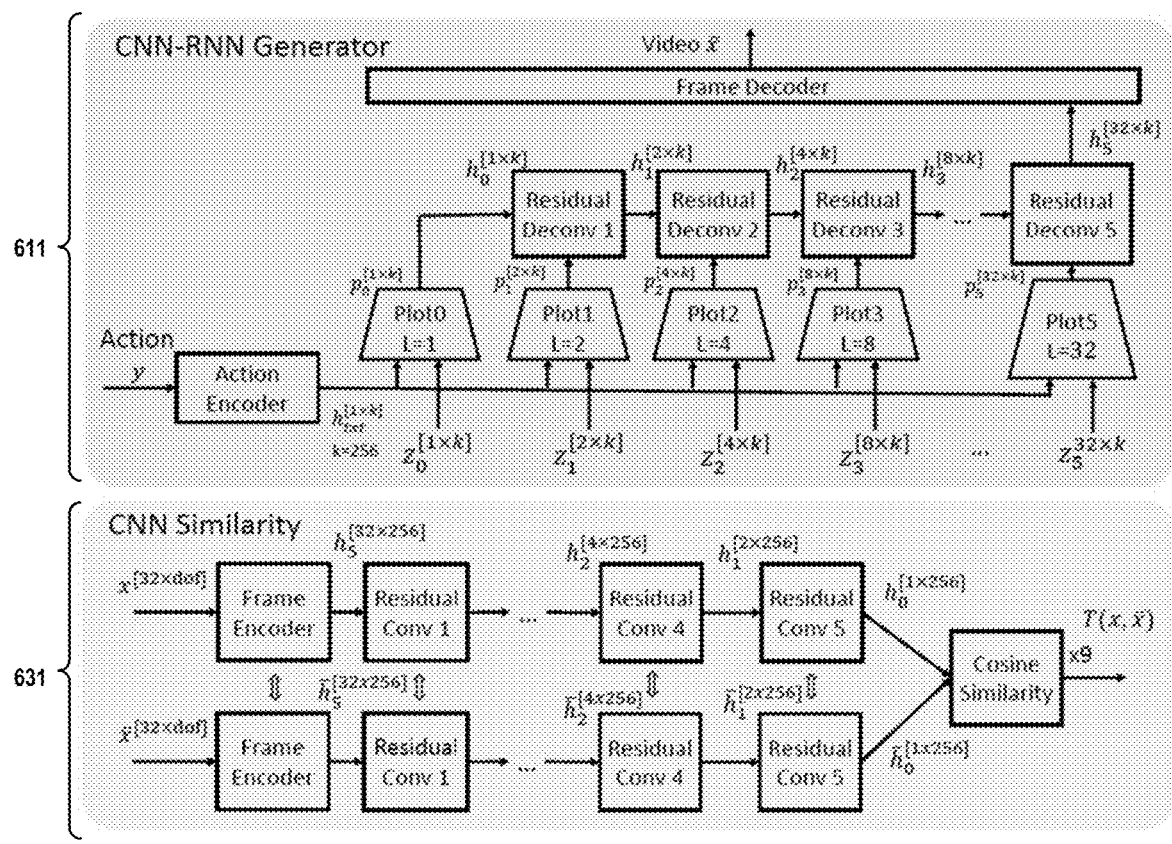

FIG. 6A, and FIG. 6B illustrate systems for identifying, based on a query, relevant videos from a database of videos by performing a generative ranking process, in accordance with one or more aspects of the present disclosure. Specifically, the example of FIG. 6A is a conceptual diagram illustrating an example system for identifying, based on a textual query, relevant videos from a database of videos, where the system provides information that can be used to explain how the system has identified relevant videos. The example of FIG. 6A illustrates system 600 including animation generator 610, comparison module 630 and video data store 505. Video data store 505 includes videos 506A through 506N. In the example of FIG. 6A, animation generator 610 accepts textual query 602 and generates one or more animations 620. Comparison module 630 uses animation 620 to search data store 505 by comparing animation(s) 620 to each of the videos 506 within data store 505. Based on these comparisons, comparison module 630 identifies one or more relevant videos 640.

In the example described, animation generator 610 first generates exemplar clips using a machine learning model, such as a GAN or DVGAN model. For example, given a query "walking", the animation generator 610 may generate a number (e.g., 30) fixed-length animations, clips, or videos (e.g., animation 620) as exemplars that animation generator 610 has determined, based on its training, represent the "walking" action. To find closest matches in the video database, comparison module 630 may use a CNN-CNN similarity function between videos 506 in video data store 505 and one or more animations 620. Similar to discriminative ranking, as illustrated in connection with FIG. 5A, a long video may be partitioned into multiple fixed-length clips and module 630 may average the matching scores over the entire video.

In some examples, generator 610 may generate multiple exemplar animations 620, where one or more video clips in data store 505 are matched to multiple exemplar animations to produce multiple scores. In such an example, a soft maximum may be taken over the matching scores (thereby producing a single score) as the final score of a given video clip in relation to the query.

For the example of FIG. 6A, however, the generated exemplars (e.g., animations 620) represent how the generative ranking model interprets the query. These animations 620 therefore serve as an explanation when presented to the user (i.e., a global explanation) of the decisions made by module 630 when identifying relevant videos.

FIG. 6B is a conceptual diagram illustrating an example generative ranking model that may correspond to animation generator 610 and comparison module 630 of FIG. 6A. The generative ranking model of FIG. 6B includes CNN-RNN generator system 611 (corresponding to generator 610) and Siamese CNN similarity system 631 (corresponding to comparison module 630). In operation, the system of FIG. 6B includes consists of two stages. In the first stage, a number of fixed-length exemplar video clips are generated (e.g., 30 exemplar video clips) by a GAN model based on a text query. In the second stage, video clips from a data store of videos (e.g., data store 505) are matched with each of the generated exemplar video clips using a CNN-CNN similarity function, thereby producing a number (e.g., 30) scores representative of the degree to which each video matches the exemplars. In some examples, a soft maximum is taken over the matching scores as the final score of the video clip and the query. The system of FIG. 6B may use a Wasserstein GAN objective function, which corresponds to the average score assigned to real videos of the target action, minus the average score for generated videos, plus a gradient penalty term for stabilizing optimization. The discriminator may seek to maximize this objective, and the generator may seek to minimize this objective. Parameters of the discriminator and generator may be learned through alternating gradient descent, in which the discriminator learns to improve its classification performance, followed by the generator learning to improve the quality of the videos it creates. When equilibrium is reached, the generator will generate the real video distribution P(x|y), and the discriminator will, in some examples, not be able to tell generated videos from real videos. The second stage involves learning a scoring function that matches the generated exemplars with the target video clip for sorting.

The system illustrated in FIG. 6A and/or FIG. 6B, or systems applying similar principles, may be used in a number of applications. One such application involves human activity search and ranking—querying a video database for certain activities of interest (e.g., corresponding to human motion). Human activity recognition is often used in the fields of surveillance, where it can be applied to large scale retrieval and visual search.

Due to the size of a typical video frame and the length of videos, instead of searching the pixels within a video directly, a system, such as that of FIG. 6A and FIG. 6B, may operate on videos that have been processed by extracting visual abstractions such as objects, parts and their spatial configurations. Processing of videos may be performed by detectors for objects, parts and relations resulting in a set of video abstractions where human body joints are accurately localized in 3D using motion capture devices. By using abstractions, a generative ranking system, such as that illustrated in FIG. 6A and FIG. 6B, may more effectively focus on the second stage of the process, where the spatial motion of human body parts are connected to the query of interest. In some examples, the database may include motion animations that use the Biovision Hierarchy (BVH) format, where human body skeletons are represented in 31 joints. Such a system may pre-process the joint angles into an exponential map representation and filter out activity that spans less than 8 seconds, and may be trained to spot query activity in a sliding window of 8 seconds.

Figure 7A:
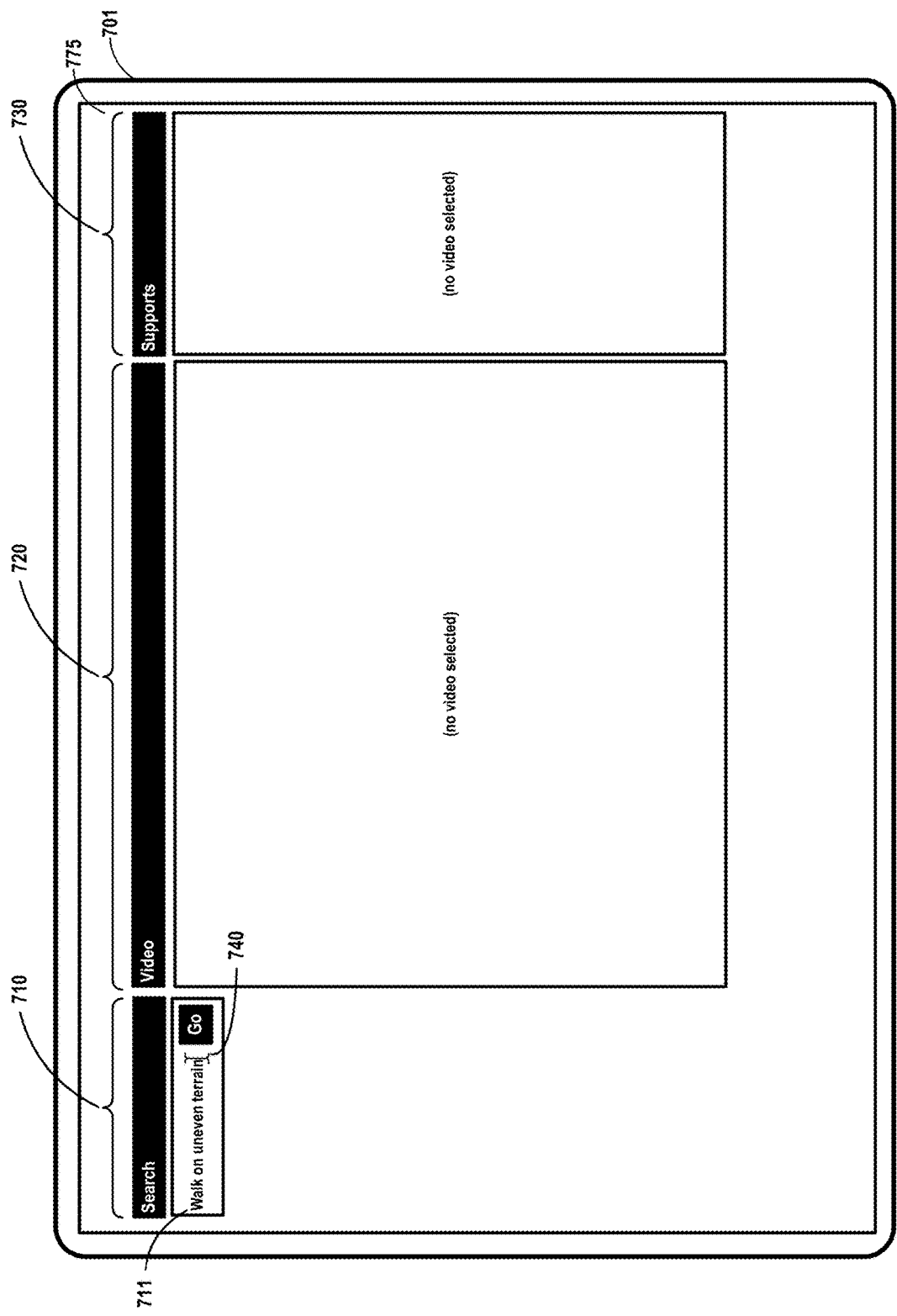
FIG. 7A, FIG. 7B, and FIG. 7C are conceptual diagrams illustrating example user interfaces associated with a video search operation, in accordance with one or more aspects of the present disclosure.
Figure 7B:
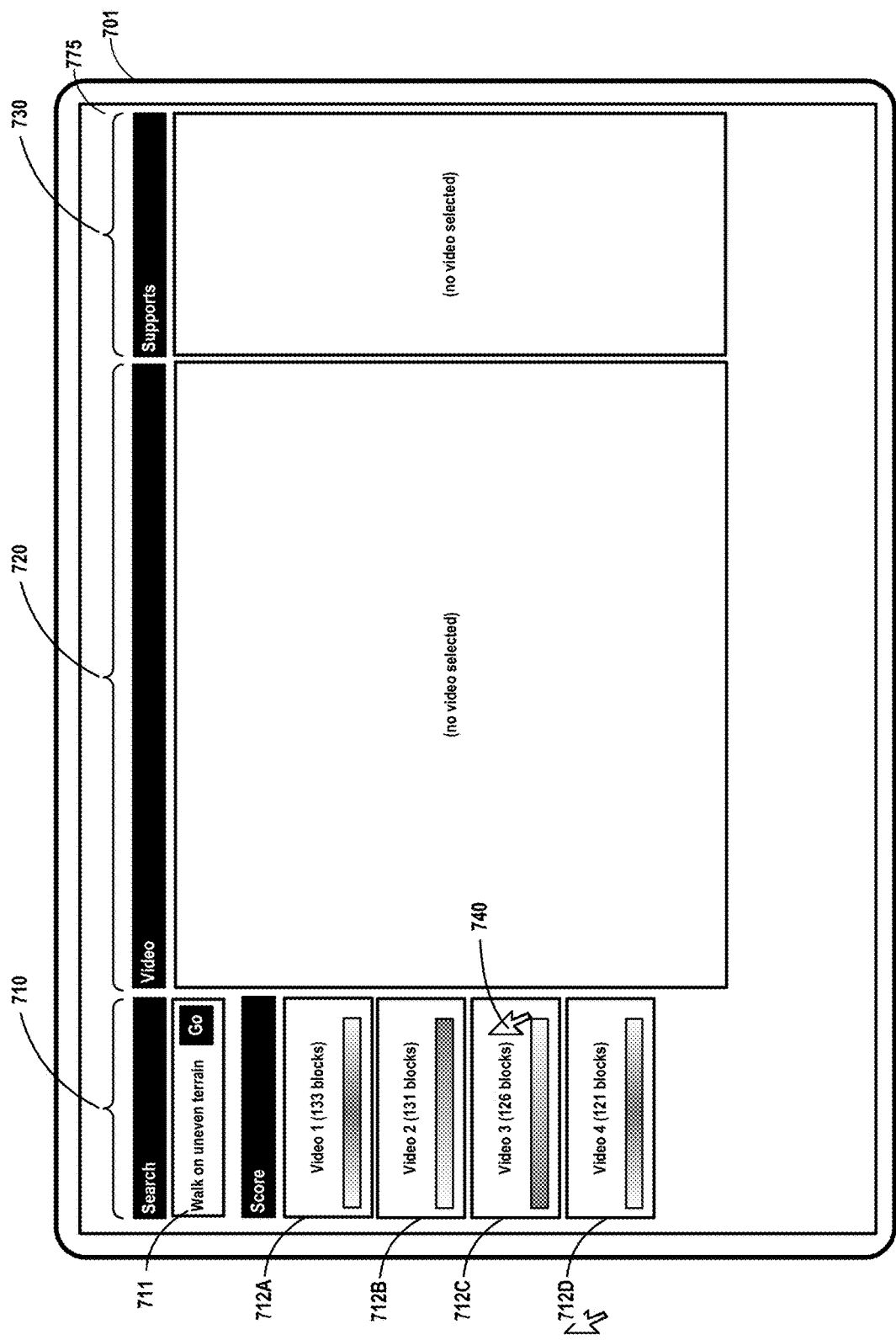
Figure 7C:
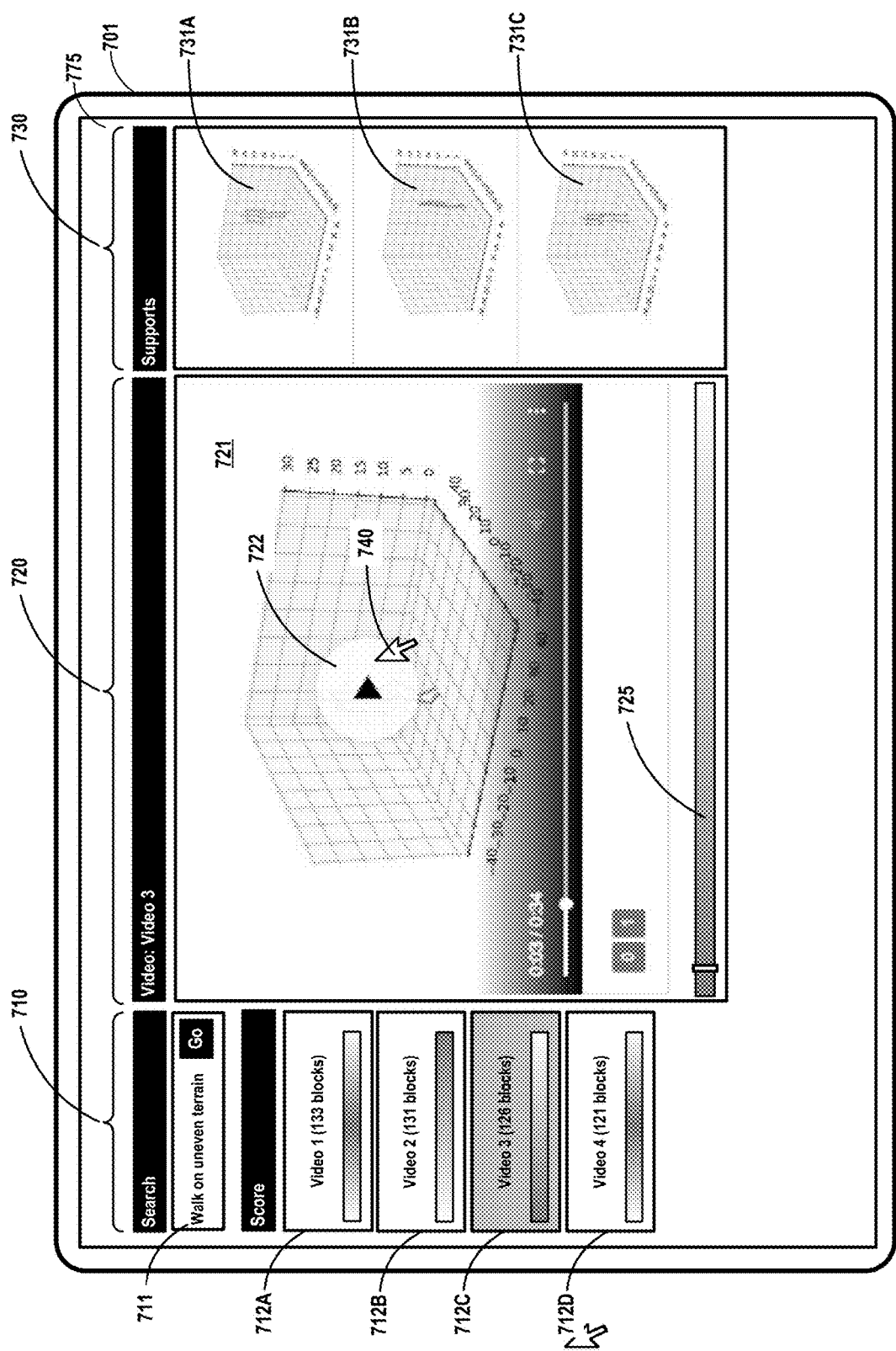

FIG. 7A, FIG. 7B, and FIG. 7C are conceptual diagrams illustrating example user interfaces associated with a video search operation, in accordance with one or more aspects of the present disclosure. User interfaces 775A, 775B, and 775C (collectively "user interfaces 775"), as illustrated in FIG. 7A, FIG. 7B, and FIG. 7C, respectively, may correspond to user interfaces presented by one or more of user interface devices 170 of FIG. 1A or FIG. 1C, or by user interface device 370 of FIG. 3. In such an example, user interfaces 775 may be presented at display 701, which may be a display device associated with or included within user interface device 170 and/or 370, and may serve as a user interfaces enabling a user (e.g., user 371 of FIG. 3) to search for a video or other data item stored within a data store (e.g., video data store 505). Although user interfaces 775 are shown as a graphical user interface, other types of interfaces may be presented in other examples, including a text-based user interface, a console or command-based user interface, a voice prompt user interface, or any other appropriate user interface. One or more aspects of FIG. 7A, FIG. 7B, and FIG. 7C may be described herein within the context of FIG. 3.

FIG. 7A is an example user interface illustrating a search query text box, and may be presented at a display device associated with a user interface device, in accordance with one or more aspects of the present disclosure. For instance, in an example that can be described with reference to FIG. 7A and FIG. 3, user interface device 370 detects input and outputs a signal over network 301. Communication unit 315 of computing system 310 detects a signal and outputs to input processing module 321 an indication of a signal. Input processing module 321 determines that the signal corresponds to a request to search for a video within video data store 505. Input processing module 321 causes communication unit 315 to output a signal over network 301. User interface device 370 detects a signal over network 301 and determines that the signal includes information sufficient to present a user interface. User interface device 370 presents user interface 775A at a display device 701 (e.g., associated with user interface device 370) as illustrated in FIG. 7A.

In the example of FIG. 7A, user interface 775 includes search area 710, video viewing area 720, and supporting evidence area 730. Search area 710 includes search text box 711.

FIG. 7B is an example user interface illustrating search result videos presented in response to user input. For instance, again with reference to FIG. 3 and FIG. 7A, computing device 370 detects input that corresponds to a search query entered by a user of device 370. Device 370 updates user interface 775A to echo, within text box 711 (which includes cursor 740), the input entered by the user of device 370. In the example illustrated, the text corresponds to a "Walk on uneven terrain" query, which is illustrated in text box 711. User interface device 370 detects further input corresponding to selection of a "Go" button within text box 711, and outputs a signal over network 301. Communication unit 315 of computing system 310 detects a signal that search module 325 determines corresponds to input that includes the "Walk on uneven terrain" search query. Search module 325 uses the search query to generate one or more animations (e.g., animation 380) that corresponds to or is representative of the text query. In the example being described, search module 325 generates a query of a person walking on uneven terrain. Search module 325 may use any of the techniques described or illustrated herein for generating the one or more animation, including those described or illustrated in connection with FIG. 1A, FIG. 1C, FIG. 6A, FIG. 6B, or others.

Search module 325 then uses the generated animation to search for similar or matching videos within video data store 305. In some examples, search module 325 uses the techniques described in connection with FIGS. 6A and 6B to identify, using the generated animation, similar or matching videos. Search module 325 causes communication unit 315 to output a signal over network 301. User interface device 370 detects a signal over network 301 and determines that the signal includes information sufficient to present a user interface. User interface device 370 presents user interface 775B at a display device 701 as illustrated in FIG. 7B.

In the example of FIG. 7B, user interface 775B includes, within search area 710 and below text box 711, display elements corresponding to search result videos 712A, 712B, 712C, and 712D (collectively "search result videos 712"). Each of search result videos 712 corresponds to one of the videos that search module 325 has determined is similar to or matches the animation generated by search module 325 based on the text query "Walk on uneven terrain." In some examples, each of the display elements may indicate information about the relevance of each such video 712 to the search query. Such information may be conveyed by a score, or a color, a confidence bar (described below), or otherwise.

FIG. 7C is an example user interface illustrating playback of a selected search result video and representations of corresponding supporting videos. For instance, with reference to FIG. 3A and FIG. 7B, computing device 370 detects input that corresponds to selection, using cursor 740, of search result video 712C. Computing device 370 outputs a signal over network 301. Communication unit 315 of computing system 310 detects a signal that search module 325 determines corresponds to input selecting search result video 712C. Search module 325 causes communication unit 315 to output a signal over network 301. User interface device 370 detects a signal over network 301 and determines that the signal includes information sufficient to present a user interface. User interface device 370 presents user interface 775C at a display device 701 as illustrated in FIG. 7C.

In the example of FIG. 7C, video viewing area 720 presents video 712C within area 721. In some examples, search result video 712C is automatically played within area 721 upon user interface 775C being presented at display device 701. In other examples, search result video 712C is played within area 721 in response to a selection of display element 722. Confidence bar 725 is also shown within video viewing area 720, and may represent a time span of the duration of the video. In some examples, confidence bar 725 may be illustrated so that it includes visual information (shading, color, or other information) that indicates where portions of the video that are particularly relevant to the search query may be found.

Also included within user interface 775C are supporting evidence video 731A, supporting evidence video 731B, and supporting evidence video 731C (collectively "supporting evidence videos 731"). In the example shown, each of videos 731 corresponds to one of the animations generated by search module 325 that corresponds to or is representative of the "Walk on uneven terrain" search query. As described above, in this example, one or more of these videos 731 were used by search module 725 to search for similar or matching videos within video data store 305. The videos 731 present supporting evidence that tends to illustrate the process by which the search result videos 712 were identified, and may serve as an explanation of the search result process. Such supporting evidence might be used as the basis for a user of computing device 370 to determine to what extent videos 712 represent videos relevant to the "Walk on uneven terrain" search query.

In general, a set of user interfaces corresponding to user interfaces 775 may enable a user to input a search query, select a ranking algorithm (Generative, Discriminative or Nearest Neighbor), and initiate a search. In some examples, once search processing has been performed, all the videos in the database may be ranked in a new list with the most relevant videos listed at the top of the list. Once one of the videos is selected, the video becomes available for the user to view, along with a confidence bar, which may be located below a navigation bar, showing areas of interest where the query of interest is most likely to occur. In an XAI model employing generative ranking, in addition to confidence bar 725, the user may be presented with an unsorted set of generated evidence videos or animations that the algorithm used to rank the list of videos. Upon clicking on the confidence bar in a certain segment, the score for that segment is presented to the user, and the list of evidence may then be sorted to show the most important evidence videos at the top of the list. In response to clicking on one of the evidence videos, a user interface may be updated to show a pop-up video player, enabling a user to visualize the evidence clip.

In some examples, the interfaces 775 of FIG. 7A, FIG. 7B, and FIG. 7C may act as a mediator between the user and the model permitting the model's rationale for decisions to be explained in a variety of ways. Such an explanation interface may enable visualization of the instances generated by the generative models, and illustrate confidence scores (e.g., as display elements) showing the uncertainty in the outcomes to support the user's understanding about why a specific instance was returned and how confident the system is in the decision. Such an approach may help a user set an appropriate level of trust in outcomes of the XAI system. In some examples, user interfaces may be designed such that they enable visualization of explanations generated by the model and allow the user to drill down on decisions, by navigating through a hierarchy or list of exemplar videos to find a video that is relevant (or most relevant) to a search query. Presentation of exemplar videos in such a manner may serve as a new type of provenance information model. Such a system may exhibit performance characteristics that are at least comparable to a black-box AI discriminative ranking system, while also providing the benefits of an explainable artificial intelligence system that enables a user to make effective decisions about the trustworthiness or quality of the AI system. In a discriminative ranking and nearest neighbor system, a user might have little evidence to support the provided decision, and may be unable to effectively determine the quality of the decisions made by the system, which may reduce a user's ability to determine whether to accept or reject the answer provided by the model.

As illustrated, the explainable user interfaces illustrated in FIG. 7A, FIG. 7B, and FIG. 7C, may take the form of a dashboard-like design geared towards domain experts who might not have deep knowledge of artificial intelligence, but might be well-versed in the data upon which the system operates. Such an approach may be capable of handling a variety of application areas and accompanying datasets, enabling a user to answer textual queries with visual rationales and confidence scores for the answers. User interfaces having such a form may also allow a data domain expert to observe the evidence and make an informed decision whether to trust the XAI system, by supporting drill down into deeper evidence for the provided answers and the level of confidence the model is reporting.

Figure 8:
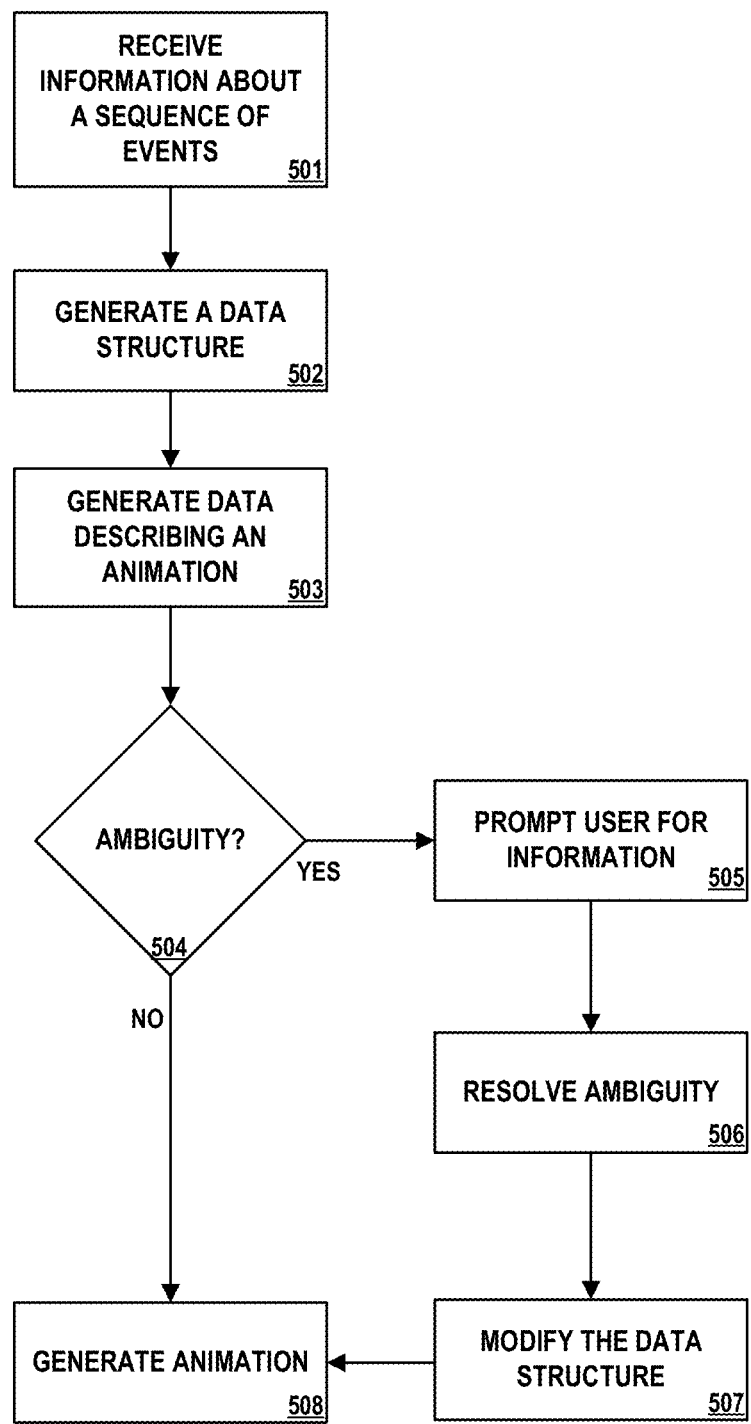
FIG. 8 is a flow diagram illustrating operations performed by an example computing system, in accordance with one or more aspects of the present disclosure.

FIG. 8 is a flow diagram illustrating operations performed by an example computing system in accordance with one or more aspects of the present disclosure. FIG. 8 is described below within the context of computing system 310 of FIG. 3. In other examples, operations described in FIG. 8 may be performed by one or more other components, modules, systems, or devices. Further, in other examples, operations described in connection with FIG. 8 may be merged, performed in a difference sequence, omitted, or may encompass additional operations not specifically illustrated or described.

In the process illustrated in FIG. 8, and in accordance with one or more aspects of the present disclosure, computing system 310 may receive information about a sequence of events (801). For example, with reference to FIG. 3, communication unit 315 of computing system 310 detects a signal over network 301. Communication unit 315 outputs to input processing module 321 an indication of a signal. Input processing module 321 determines that the signal includes textual information about a sequence of events involving a plurality of objects, such as actors and props. Input processing module 321 further determines that the textual information includes information about attributes associated with the objects, and relationships between at least two or more actors. In some examples, input processing module 321 may further determine that the signal includes textual information about a sequence of one or more commands (e.g., from a user of user interface device 370) to instantiate actors, props, and/or other features or attributes of the story. In examples described herein, an event may be a sequence of events in a story, and may correspond to an ordering without a specific time limitation.

Computing system 310 may generate a data structure (802). For instance, input processing module 321 outputs information about the story to graph module 322. Graph module 322 generates, based on the information about the sequence of events, a spatio-temporal composition graph

328 specifying attributes associated with the objects and further specifying relationships between at least some of the plurality of objects.

Computing system 310 may generate data describing an animation (803). For instance, graph module 322 may, based on composition graph 328, generate information about an animation illustrating the sequence of events. In some examples, the information is not an animation, but instead is information sufficient to create an animation illustrating the sequence of events. In such an example, the information may correspond to API calls that, when presented to an animation generator (e.g., animation module 324), will cause the animation generator to generate an animation (808). In other examples, the information about an animation may correspond to data that is, or that represents, an animation.

Computing system 310 may identify an ambiguity in the story (804). For instance, graph module 322 may, when generating the information about the animation, identify an aspect of composition graph 328 that is not clear from the received information about the sequence of events. In one example, the ambiguity might relate to an actor's appearance, or the actor's movements or posture.

In response to identifying an ambiguity, computing system 310 may prompt a user for information (805). For instance, graph module 322 causes communication unit 315 to output a signal over network 301. User interface device 370 detects a signal and determines that the signal includes information sufficient to generate a user interface. User interface device 370 presents a user interface, prompting a user for information.

Computing system 310 may resolve the ambiguity based on the user's response (806). For instance, still referring to FIG. 3, user interface device 370 outputs a signal over network 301. Communication unit 315 of computing system 310 detects a signal and outputs information about the signal to graph module 322. Graph module 322 determines that the signal includes information resolving the identified ambiguity. In one example, the ambiguity may be about an item of clothing worn by an actor, and the information may indicate the color of that item of clothing. In another example, the ambiguity may be about how an actor performed a movement occurring in the story, and the information may describe the manner in which an actor performs the movement (e.g., quickly, slowly, angrily).

Computing system 310 may modify the data structure (807). For instance, again referring to FIG. 3, graph module 322 updates composition graph 328 to reflect the new information, adding details about one or more aspects of the story to composition graph 328. Graph module 322 may generate an animation based on the updated composition graph 328. In examples where an animation has already been generated based on an earlier version of composition graph 328, graph module 322 may generate a new composition graph 328 incorporating the modifications performed in response to resolving the ambiguity.

Computing system 310 may generate an animation based on the new composition graph. For instance, at the direction of graph module 322, animation module 324 processes the new composition graph and instantiates a new animation 380 or updates a previously-generated animation 380.

In some examples, computing system may respond to a query posed by a user. For instance, in one such example, user interface device 370 detects input and outputs a signal over network 301. Communication unit 315 of computing system 310 detects a signal and outputs information about the signal to graph module 322. Graph module 322 determines that the signal includes a query posed by a user of device 370 relating to one or more aspects of animation 380. Graph module 322 analyzes the query and determines a response to the query based on the composition graph 328. Graph module 322 causes communication unit 315 to output a signal over network 301. User interface device 370 detects a signal and determines that the signal includes information sufficient to generate a user interface. User interface device 370 presents a user interface that includes the response to the user's query.

Figure 9:
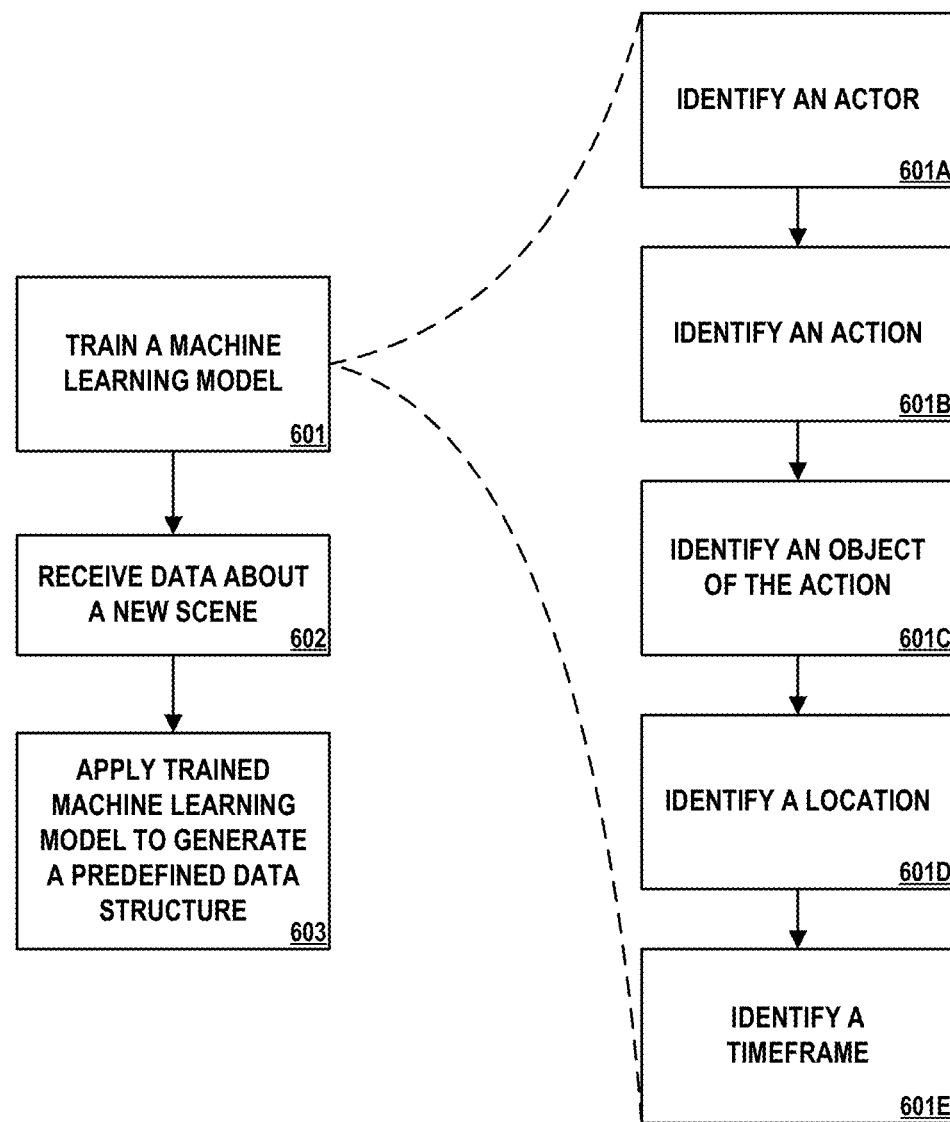
FIG. 9 is a flow diagram illustrating other operations performed by an example computing system in accordance with one or more aspects of the present disclosure.

FIG. 9 is a flow diagram illustrating operations performed by an example computing system in accordance with one or more aspects of the present disclosure. As in FIG. 8, FIG. 9 is described below within the context of computing system 310 of FIG. 3. In other examples, operations described in FIG. 9 may be performed by one or more other components, modules, systems, or devices. Further, in other examples, operations described in connection with FIG. 9 may be merged, performed in a difference sequence, omitted, or may encompass additional operations not specifically illustrated or described.

In the process illustrated in FIG. 9, and in accordance with one or more aspects of the present disclosure, computing system 310 may train a machine learning model (901). For instance, in some examples, communication unit 315 of computing system 310 detects input over network 301 from a computing system administering training data 305. Communication unit 315 outputs to graph module 322 information about the input. Graph module 322 determines that the input corresponds to training data that can be used to train a machine learning model. In some examples, the training data includes, for each of a number of scenes, textual information about the scene and visual information about the scene. The textual information about the scene may include information about a communication occurring during the scene, and the visual information about the scene may include information about an action occurring during the scene. Further, in some examples, the training data may include a data structure describing the scene, wherein the data structure includes data representing the communication and data representing the action. The data structure may be used in a supervised machine learning process to train module 322 to predict a data structure from new textual information and visual information.

In some examples, graph module 322 (and/or input module 321) may parse the textual information associated with each training sample within the training data into an event frame. Such an event frame may be in the form of a "who" "did what" "to whom" "where" and "when" format. Accordingly, graph module 322 may identify an actor (901A) mapped to the "who" portion of the event frame, identify an action (901B) mapped to the "did what" portion of the event frame, identify an object (901C) mapped to the "to whom" portion of the event frame, identify a location (901D) mapped to the "where" portion of the event frame, and identify a timeframe (901E) mapped to the "when" portion of the event frame.

Computing system 310 may receive data about a new scene (902). For instance, after graph module 322 is trained with training data 305, communication unit 315 detects input that graph module determines corresponds to story information 332 from device 370. In some examples, story information includes information about a new scene that includes textual information about the new scene and visual information about the new scene.

Computing system 310 may apply the trained machine learning model to generate a predefined data structure. For instance, graph module 322 generates, by applying the trained machine learning model to the data about the new scene, a predefined data structure. To generate the data structure, graph module 322 may parse the textual information about the new scene and process the visual information about the new scene.

Figure 10:
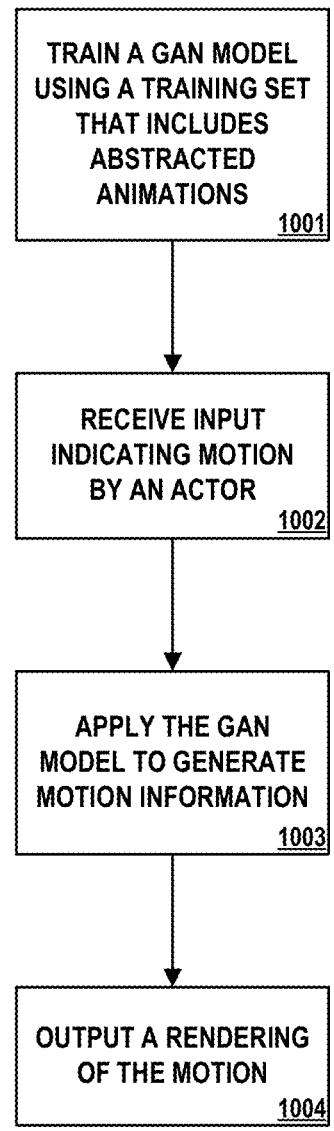
FIG. 10 is a flow diagram illustrating other operations performed by an example computing system in accordance with one or more aspects of the present disclosure.

FIG. 10 is a flow diagram illustrating operations performed by an example computing system in accordance with one or more aspects of the present disclosure. As in FIGS. 8 and 9, FIG. 10 is described below within the context of computing system 310 of FIG. 3. In other examples, operations described in FIG. 10 may be performed by one or more other components, modules, systems, or devices. Further, in other examples, operations described in connection with FIG. 10 may be merged, performed in a difference sequence, omitted, or may encompass additional operations not specifically illustrated or described.

In the process illustrated in FIG. 10, and in accordance with one or more aspects of the present disclosure, computing system 310 may train a generative adversarial network (GAN) model using a training set that includes abstracted animations of motion (1001). For instance, in some examples, communication unit 315 of computing system 310 detects input over network 301 from a computing system administering training data 305. Communication unit 315 outputs to animation module 324 information about the input. Animation module 324 determines that the input corresponds to training data 305 that includes abstracted animations of motion. In some examples, the abstracted animations of motion may be animations where human actors are represented by body skeletons and a finite number of joints, abstracted from a much larger set of full pixel data for each human actor. Animation module 324 trains the GAN model to identify optimized parameters to generate an animation from input describing motion. In some examples, animation model trains a machine learning model that employs a dense validation generative adversarial network (DVGAN).

Computing system 310 may receive input indicating motion by an actor (1002). For instance, in some examples, after a GAN model is trained with training data 305, communication unit 315 detects input that input module 321 determines corresponds to text input describing motion by a human actor. In some examples, the text input may be information describing a scene or event. In other examples, the text input may be a text query relating to motion ("sweep floor" or "walk on uneven terrain").

Computing system 310 may apply the GAN model to the text input to generate motion information (1003). For instance, in some examples, animation module 324 applies optimized DVGAN parameters to generate one or more exemplar animations 380 that correspond to the text input.

Computing system 310 may output a rendering of the motion information (1004). For instance, in some examples, animation module 324 may output information about the exemplar animations 380 to a similarity function in order to identify, within a data store of videos (e.g., data store 505), matching or similar videos within the data store. In another example, animation module 324 may output information about an exemplar animation 380 within a user interface for presentation and/or playback at a user interface device (e.g., device 370) in connection with a visual storytelling platform.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, a limited number of devices or modules (e.g., language processors 107, machine learning modules 109, language parsers 118, non-text processors 119, dialogue managers 122, gesture and gaze tracking modules 124, user interface devices 370, computing systems 310, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1A, FIG. 1C, FIG. 3) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/ or firmware.

What is claimed is:

1. A method for identifying a relevant animation from among a plurality of animations, comprising:
   receiving, by a computing system, a text search query describing motion being performed by an actor;
   prior to receiving the text search query describing motion, training a machine learning model to predict an animation from textual input;
   generating a search animation by applying the machine learning model to the search query, wherein the search animation includes visual information representing the motion performed by the actor;
   comparing, by the computing system, the search animation to each of the plurality of animations to generate, for each of the plurality of animations, a comparison score indicating similarity of each respective animation to the search animation; and
   identifying, by the computing system and based on each of the comparison scores associated with each of the plurality of animations, the relevant animation from among the plurality of animations.

2. The method of claim 1, wherein identifying the relevant animation includes:
   presenting information about the search animation.

3. The method of claim 2, wherein presenting information about the search animation includes:
   presenting information based on prior search queries related to the search query.

4. The method of claim 2, wherein presenting information about the search animation includes:
   presenting a hierarchy of search animations.

5. The method of claim 1, wherein the machine learning model is a dense validation generative adversarial network (DVGAN) model.

6. The method of claim 1,
   wherein generating a search animation includes generating a plurality of search animations, wherein comparing the search animation includes comparing each of the plurality of search animations to each of the plurality of animations; and wherein identifying a relevant animation from among the plurality of animations includes identifying a plurality of relevant animations, each of the relevant animations being relevant to one or more of the plurality of search animations.

7. The method of claim 6, wherein identifying each of the plurality of relevant animations further includes:

presenting, for each of the relevant animations, information about at least one of the search animations.

8. The method of claim 6, wherein generating the plurality of search animations includes generating a plurality of search animations using a generative adversarial network (GAN).

9. The method of claim 8, wherein comparing each of the plurality of search animations to each of the plurality of animations includes using a similarity function.

10. A system comprising:

a storage device; and processing circuitry having access to the storage device and configured to:

receive a text search query describing motion being performed by an actor, prior to receiving the text search query describing motion, train a machine learning model to predict an animation from textual input, generate a search animation by applying the machine learning model to the search query, wherein the search animation includes visual information representing the motion performed by the actor, compare the search animation to each of a plurality of animations to generate, for each of the plurality of animations, a comparison score indicating similarity of each respective stored animation to the search animation, and identify, based on each of the comparison scores associated with each of the plurality of animations, a relevant animation from among the plurality of animations.

11. The system of claim 10, wherein to identify the relevant animation, the processing circuitry is further configured to:

present information about the search animation.

12. The system of claim 10, wherein the machine learning model is a dense validation generative adversarial network (DVGAN) model.

13. The system of claim 10, wherein generating a search animation includes generating a plurality of search animations, wherein comparing the search animation includes comparing each of the plurality of search animations to each of the plurality of animations; and wherein identifying a relevant animation from among the plurality of animations includes identifying a plurality of relevant animations, each of the relevant animations being relevant to one or more of the plurality of search animations.

14. The system of claim 13, wherein to identify each of the plurality of relevant animations, the processing circuitry is further configured to:

present, for each of the relevant animations, information about at least one of the search animations.

15. The system of claim 13, wherein to generate the plurality of search animations, the processing circuitry is further configured to:

generate a plurality of search animations using a generative adversarial network (GAN).

16. The system of claim 15, wherein comparing each of the plurality of search animations to each of the plurality of animations includes using a CNN-CNN similarity function.

17. A computer-readable storage medium comprising instructions that, when executed, configure processing circuitry of a computing system to:

receive a text search query describing motion being performed by an actor;

prior to receiving the text search query describing motion, train a machine learning model to predict an animation from textual input, generate a search animation by applying the machine learning model to the search query, wherein the search animation includes visual information representing the motion performed by the actor;

compare the search animation to each of a plurality of animations to generate, for each of the plurality of animations, a comparison score indicating similarity of each respective animation to the search animation; and identify, based on each of the comparison scores associated with each of the plurality of animations, a relevant animation from among the plurality of animations.

18. The computer-readable storage medium of claim 17, further comprising instructions that, when executed, configure processing circuitry of the computing system to:

present information about the search animation.

* * * * *